(12) United States Patent
Skala

(10) Patent No.: US 10,692,156 B2
(45) Date of Patent: Jun. 23, 2020

(54) PAYMENT SYSTEM AND METHOD

(71) Applicant: Thomas Skala, Encino, CA (US)

(72) Inventor: Thomas Skala, Encino, CA (US)

( * ) Notice: Subject to any disclaimer, the term of this patent is extended or adjusted under 35 U.S.C. 154(b) by 3 days.

(21) Appl. No.: 14/848,025

(22) Filed: Sep. 8, 2015

(65) Prior Publication Data

US 2016/0071069 A1 Mar. 10, 2016

Related U.S. Application Data

(60) Provisional application No. 62/046,837, filed on Sep. 5, 2014.

(51) Int. Cl.
*G06Q 40/00* (2012.01)
*G06Q 20/40* (2012.01)
*G06Q 20/04* (2012.01)
*G06Q 20/00* (2012.01)

(52) U.S. Cl.
CPC ....... *G06Q 40/125* (2013.12); *G06Q 20/0425* (2013.01); *G06Q 20/4016* (2013.01)

(58) Field of Classification Search
CPC ........ G06Q 20/40; G06Q 20/00; G06Q 40/00; G10L 21/00
USPC ................... 705/39, 44, 45, 38, 32; 235/379
See application file for complete search history.

(56) References Cited

U.S. PATENT DOCUMENTS

| | | |
|---|---|---|
| 5,058,152 A | 10/1991 | Solomon et al. |
| 5,163,080 A | 11/1992 | Amoroso et al. |
| 5,742,763 A | 4/1998 | Jones |
| 5,940,834 A | 8/1999 | Pinard et al. |
| 6,002,750 A | 12/1999 | Ertz |
| 6,205,478 B1 | 3/2001 | Sugano et al. |
| 6,226,359 B1 | 5/2001 | Montgomery et al. |
| 6,243,374 B1 | 6/2001 | White et al. |
| 6,263,352 B1 | 7/2001 | Cohen |
| 6,292,799 B1 | 9/2001 | Peek et al. |
| 6,330,079 B1 | 12/2001 | Dugan et al. |
| 6,701,343 B1 | 3/2004 | Kenyon |
| 6,732,332 B1 | 5/2004 | Borysewicz et al. |
| 6,751,453 B2 | 6/2004 | Schemers et al. |
| 6,813,489 B1 | 11/2004 | Wu et al. |
| 7,043,530 B2 | 5/2006 | Isaacs et al. |
| 7,185,059 B2 | 2/2007 | Daniell et al. |
| 7,194,437 B1 * | 3/2007 | Britto ................... G06Q 20/00 705/39 |
| 7,386,490 B2 | 6/2008 | Barritz |
| 7,620,689 B2 | 11/2009 | LoBuono et al. |
| 7,660,294 B2 | 2/2010 | Burg |
| 7,668,926 B2 | 2/2010 | Fein et al. |
| 7,752,132 B2 * | 7/2010 | Stewart ................. G06Q 20/04 705/35 |
| 7,760,860 B2 | 7/2010 | Adamczyk et al. |

(Continued)

OTHER PUBLICATIONS

PayPal Publication www.archive.org (Year: 2013).*

*Primary Examiner* — Oluseye Iwarere
(74) *Attorney, Agent, or Firm* — Jason P. Webb; Pearson Butler

(57) ABSTRACT

A payment system having a payer module and a requester module functionally coupled over a network and managed by an administration module that produces electronic substitute checks in response to instructions from the payer module. The payment system includes a risk management module that performs a risk management operation before the system produces an electronic substitute check.

11 Claims, 26 Drawing Sheets

(56) References Cited

U.S. PATENT DOCUMENTS

| | | | |
|---|---|---|---|
| 7,840,209 B2 | 11/2010 | Kwon et al. | |
| 7,853,524 B2* | 12/2010 | Kight | G06Q 20/04 705/34 |
| 7,904,799 B1 | 3/2011 | Underwood et al. | |
| 7,908,342 B2 | 3/2011 | Harper et al. | |
| 7,945,038 B2 | 5/2011 | Adamczyk et al. | |
| 7,958,053 B2* | 6/2011 | Stone | G06Q 20/042 235/379 |
| 8,060,441 B2* | 11/2011 | Stewart | G06Q 20/04 705/38 |
| 8,346,659 B1* | 1/2013 | Mohsenzadeh | G06Q 20/40 705/39 |
| 8,401,966 B2* | 3/2013 | Stewart | G06Q 20/04 705/38 |
| 8,510,220 B2* | 8/2013 | Rackley, III | G06Q 40/00 705/39 |
| 8,745,166 B2* | 6/2014 | Faith | G06Q 30/06 709/218 |
| 8,762,272 B1* | 6/2014 | Cozens | G06Q 20/10 705/40 |
| 10,026,119 B2* | 7/2018 | Green | G06Q 40/02 |
| 2001/0044764 A1* | 11/2001 | Arnold | G06Q 20/04 705/35 |
| 2002/0032653 A1* | 3/2002 | Schutzer | G06Q 20/04 705/40 |
| 2002/0111937 A1 | 8/2002 | Wetherbee et al. | |
| 2002/0120846 A1* | 8/2002 | Stewart | G06Q 20/04 713/168 |
| 2004/0044627 A1* | 3/2004 | Russell | G06Q 20/00 705/50 |
| 2004/0152493 A1 | 8/2004 | Phillips et al. | |
| 2004/0186895 A1 | 9/2004 | Ellis | |
| 2005/0058260 A1 | 3/2005 | Lasensky et al. | |
| 2005/0125308 A1 | 6/2005 | Puentes et al. | |
| 2005/0131816 A1* | 6/2005 | Britto | G06Q 20/00 705/39 |
| 2006/0080245 A1* | 4/2006 | Bahl | G06Q 20/04 705/40 |
| 2006/0212355 A1 | 9/2006 | Teague et al. | |
| 2006/0258380 A1 | 11/2006 | Liebowitz et al. | |
| 2006/0258399 A1 | 11/2006 | Liebowitz et al. | |
| 2007/0005969 A1 | 1/2007 | Fullerton | |
| 2007/0050488 A1 | 3/2007 | Joyner, Jr. et al. | |
| 2007/0099659 A1 | 5/2007 | Borquez et al. | |
| 2007/0136789 A1 | 6/2007 | Fotta et al. | |
| 2007/0143181 A1 | 6/2007 | Linkner et al. | |
| 2007/0162566 A1 | 7/2007 | Desai et al. | |
| 2007/0232261 A1 | 10/2007 | Spector | |
| 2007/0244811 A1* | 10/2007 | Tumminaro | G06Q 20/3255 705/39 |
| 2007/0255620 A1* | 11/2007 | Tumminaro | G06Q 20/322 705/14.27 |
| 2007/0255652 A1 | 11/2007 | Tumminaro et al. | |
| 2007/0260537 A1* | 11/2007 | Stone | G06Q 20/042 705/39 |
| 2008/0006685 A1* | 1/2008 | Rackley, III | G06Q 20/10 235/379 |
| 2008/0008158 A1 | 1/2008 | Lee | |
| 2008/0010190 A1* | 1/2008 | Rackley, III | G06Q 20/042 705/39 |
| 2008/0010191 A1* | 1/2008 | Rackley, III | G06Q 20/042 705/39 |
| 2008/0010192 A1* | 1/2008 | Rackley, III | G06Q 20/042 705/39 |
| 2008/0010215 A1* | 1/2008 | Rackley, III | G06Q 20/042 705/70 |
| 2008/0025488 A1 | 1/2008 | Dean et al. | |
| 2008/0040265 A1* | 2/2008 | Rackley, III | G06Q 20/02 705/40 |
| 2008/0066080 A1 | 3/2008 | Campbell | |
| 2008/0126145 A1* | 5/2008 | Rackley, III | G06Q 20/102 455/406 |
| 2008/0126251 A1* | 5/2008 | Wassingbo | G06Q 20/04 705/44 |
| 2008/0177661 A1* | 7/2008 | Mehra | G06Q 20/10 705/44 |
| 2008/0243690 A1 | 10/2008 | Paintin et al. | |
| 2008/0313260 A1 | 12/2008 | Sweet et al. | |
| 2008/0320107 A1 | 12/2008 | Park | |
| 2009/0119190 A1* | 5/2009 | Realini | G06Q 20/04 705/30 |
| 2009/0156250 A1 | 6/2009 | Ang | |
| 2009/0164594 A1 | 6/2009 | Turbeville et al. | |
| 2009/0182654 A1* | 7/2009 | Mullen | G06Q 20/04 705/30 |
| 2009/0247133 A1 | 10/2009 | Holmen et al. | |
| 2009/0319638 A1* | 12/2009 | Faith | G06Q 30/06 709/219 |
| 2010/0161466 A1* | 6/2010 | Gilder | G06Q 20/04 705/34 |
| 2010/0205539 A1 | 8/2010 | Gestsson et al. | |
| 2010/0241566 A1 | 9/2010 | Kim | |
| 2010/0290599 A1 | 11/2010 | Weksel | |
| 2010/0318460 A1* | 12/2010 | Stewart | G06Q 20/04 705/40 |
| 2011/0010425 A1 | 1/2011 | Bernatz | |
| 2011/0066550 A1* | 3/2011 | Shank | G06Q 20/1085 705/43 |
| 2011/0093387 A1* | 4/2011 | Fuerstenberg | G06Q 20/102 705/40 |
| 2011/0137789 A1* | 6/2011 | Kortina | G06Q 20/405 705/38 |
| 2011/0276479 A1* | 11/2011 | Thomas | G06Q 20/102 705/40 |
| 2011/0320347 A1* | 12/2011 | Tumminaro | G06Q 20/0855 705/39 |
| 2012/0016800 A1* | 1/2012 | Stewart | G06Q 20/04 705/44 |
| 2012/0101943 A1* | 4/2012 | Park | G06Q 20/32 705/41 |
| 2012/0166270 A1* | 6/2012 | Coppinger | G06Q 30/0239 705/14.36 |
| 2012/0197801 A1* | 8/2012 | Jimenez | G06Q 20/206 705/44 |
| 2012/0284175 A1* | 11/2012 | Wilson | G06Q 20/10 705/39 |
| 2012/0290478 A1* | 11/2012 | Crofts | G06Q 20/322 705/44 |
| 2012/0323596 A1* | 12/2012 | VerHulst | G06Q 50/22 705/2 |
| 2013/0117087 A1* | 5/2013 | Coppinger | G06Q 30/0207 705/14.26 |
| 2013/0173463 A1* | 7/2013 | Stewart | G06Q 20/04 705/39 |
| 2013/0179348 A1* | 7/2013 | Crofts | G06Q 20/322 705/44 |
| 2014/0006184 A1* | 1/2014 | Godsey | G06Q 20/08 705/16 |
| 2014/0122133 A1* | 5/2014 | Weisberg | G06Q 40/08 705/4 |
| 2014/0164031 A1* | 6/2014 | Salonen | G06Q 10/025 705/5 |
| 2014/0172693 A1* | 6/2014 | Kanjlia | G06Q 20/10 705/39 |
| 2014/0188714 A1* | 7/2014 | Cozens | G06Q 20/10 705/40 |
| 2014/0222669 A1* | 8/2014 | Novak | G06Q 20/14 705/40 |
| 2014/0244514 A1* | 8/2014 | Rodriguez | G06Q 20/10 705/71 |
| 2014/0316937 A1* | 10/2014 | Jiao | G06Q 30/0643 705/26.8 |
| 2015/0026058 A1* | 1/2015 | Smith | G06Q 40/02 705/42 |
| 2015/0066748 A1* | 3/2015 | Winslow | G06Q 20/10 705/39 |
| 2015/0127527 A1* | 5/2015 | Eide | G06Q 20/227 705/39 |

(56) References Cited

U.S. PATENT DOCUMENTS

2015/0199738 A1* 7/2015 Jung ................ G06Q 30/0609
705/26.35
2015/0371212 A1* 12/2015 Giordano ............. H04W 4/029
705/44
2016/0071069 A1* 3/2016 Skala ................ G06Q 20/4016
705/32

* cited by examiner

ADMINISTRATION MODULE 18

| COMMUNICATION MODULE 22 | INTERACTIVE COMMUNICATION MODULE 26 | SUBSTITUTE CHECK MODULE 30 |
|---|---|---|
| ACCOUNT MODULE 20 | CASH BOX MODULE 24 | REQUEST PROCESSING MODULE 28 |

| Feature | Genie CashBox Lite | Genie CashBox Premium | Genie CashBox Gateway |
|---|---|---|---|
| Genie CashBox | | | |
| Genie CashBox Stored Value Account, with all the loading features | Y | Y | Y |
| Peer-to-Peer Payments online | Y | Y | Y |
| 999 Genie Number | Y | Y | Y |
| Toll Free Number –US and Canada | | Y | Y |
| Voicemail | | Y | Y |
| FAX to email | | Y | Y |
| Paging | | Y | Y |
| VOX | | Y | Y |
| GenieMail Email | | Y | Y |
| GenieMessenger | Lite | Premium | Premium |
| Receive text messages | Y | Y | Y |
| Receive Pages | Y | Y | Y |
| Receive Deposits | | Y | Y |

FIG. 21

| | | | |
|---|---|---|---|
| GenieChecking – Virtual Checking Account | | Y | Y |
| Genie CashBox Debit Card | | Y | Y |
| Genie Gateway | | | |
| Display Videos Online | | | Y |
| Play Recorded Audio Updates | | | Y |
| Display PDF Documents | | | Y |
| Group Messaging | | | Y |
| Customer Group Message Opt-In | | | Y |
| Search Engine Optimizations | | | Y |
| Call Screening | | | Y |
| Caller ID Blocking | | | Y |
| Call FollowMe (programmable forwarding) | | | Y |
| Virtual Conference Room | | | Y |

Your message was sent on March 25 at 11:16 AM

| To: | |
|---|---|
| Name: | Genie Subscriber |
| Genie #: | 800-000-0000 |

| With Your | |
|---|---|
| Name: | Thomas Sender |
| Phone #: | 818-000-0000 |
| Email: | Thomas.sender@abc.com |
| Message: | Got your proposal please call me to discuss |

FIG. 25

PAYMENT SYSTEM AND METHOD

CROSS-REFERENCE TO RELATED APPLICATIONS

This invention claims priority, under 35 U.S.C. § 120, to the U.S. Provisional Patent Application No. 62/046,837 to Thomas Skala filed on Sep. 5, 2014, which is incorporated by reference herein.

BACKGROUND OF THE INVENTION

Field of the Invention

The present invention relates to payment systems and methods, specifically a push-style payment system and method.

Description of the Related Art

Traditional methods for moving payments electronically from a consumer or borrower to a merchant or lender have been carried out under what is described as a "pull" or "grab" model. In this method of transaction handling, the payer gives to the merchant some set of identifying information (credit card number, bank account routing numbers, etc.) along with some form of "authorization" statement. The merchant or lender then uses that information to submit a transaction against the payer's account to "grab" or "pull" the funds.

The payment systems and methods heretofore known suffer from a number of disadvantages as described herein and which one of ordinary skill in the art would be aware of and/or would become aware of upon reading the disclosure found herein.

What is needed is a payment system and/or method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available interactive communication systems and methods. Accordingly, the present invention has been developed to provide an interactive communication system and method that provides a plurality of features and benefits currently unavailable with present communication systems.

According to one embodiment of the invention, there is a payment system that may include a payer module and a requester module that may be functionally coupled over a network and may be managed by an administration module that may produce electronic substitute checks in response to instructions from the payer module. The payment system may include a risk management module that may perform a risk management operation before the system produces an electronic substitute check.

According to one embodiment of the invention, there is a payment system that includes a cash box module that may track and manage currency for a user of an interactive communication module in association with that users account on the interactive communication module.

According to one embodiment of the invention, there is a payment system that may include an interactive communication module that may have a payer module that produces checks in response to instructions from the payer module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 2 is a module diagram of an administration module of a payment system, according to one embodiment of the invention; and FIGS. 3-25 illustrated non-limiting exemplary screenshots of interfaces associated with a payment system and/or method, according to one embodiment of the invention.

DETAILED DESCRIPTION OF THE INVENTION

Figure 1:
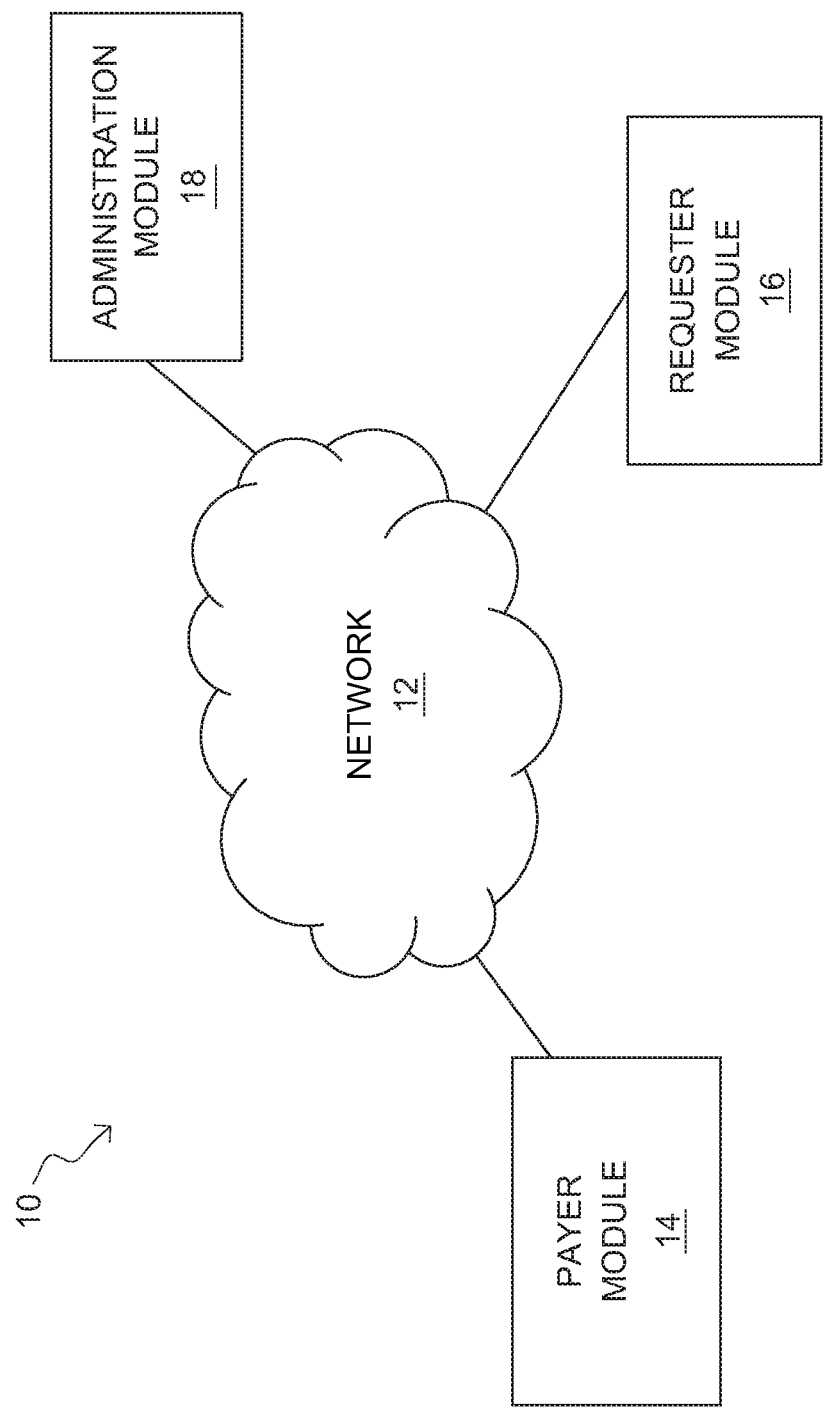
FIG. 1 is a network diagram of a payment system, according to one embodiment of the invention.
Figure 5:
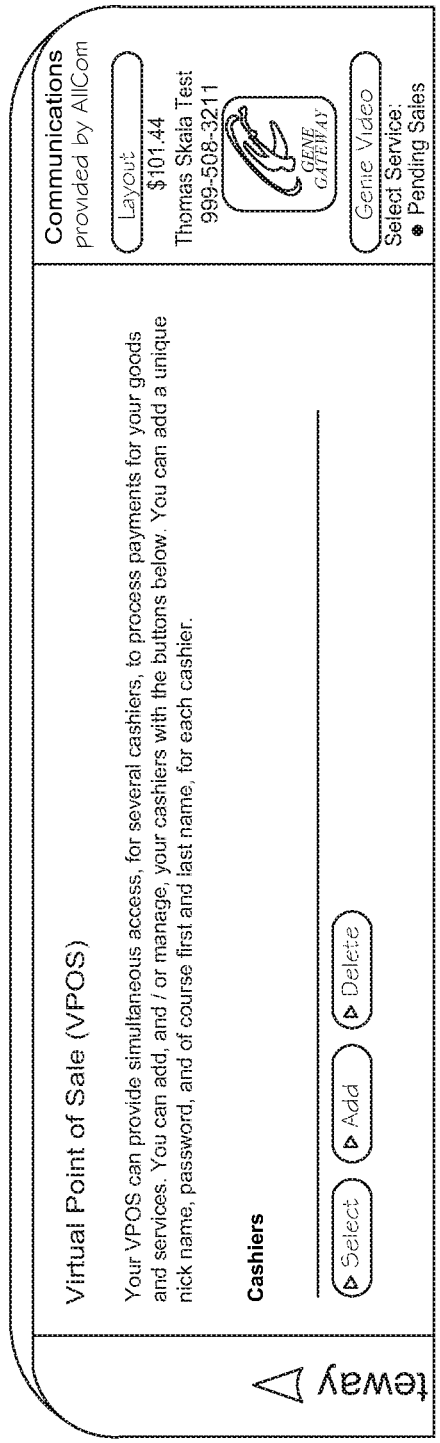
Figure 6:
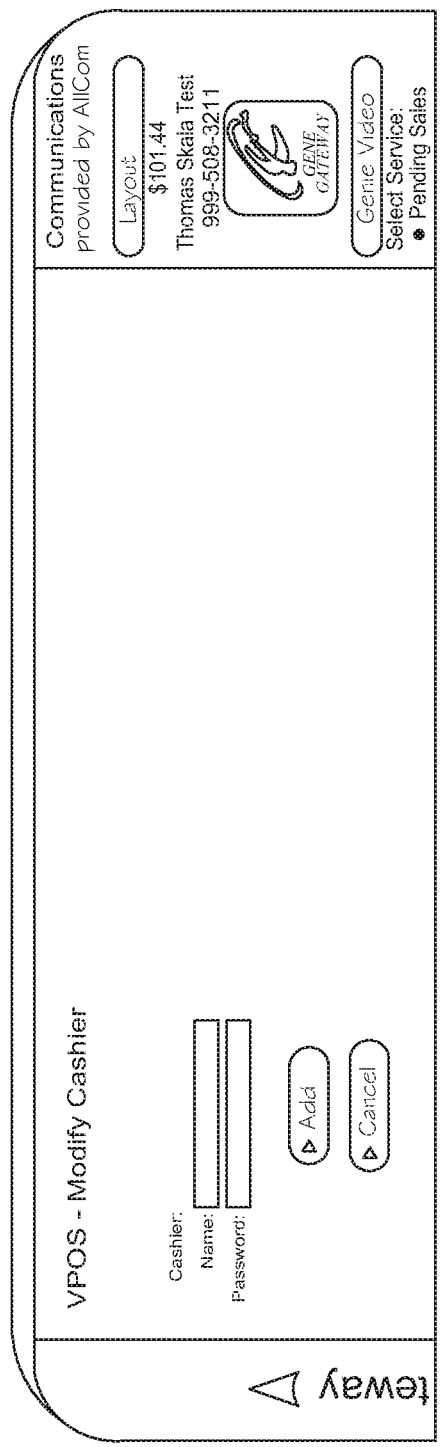
Figure 7:
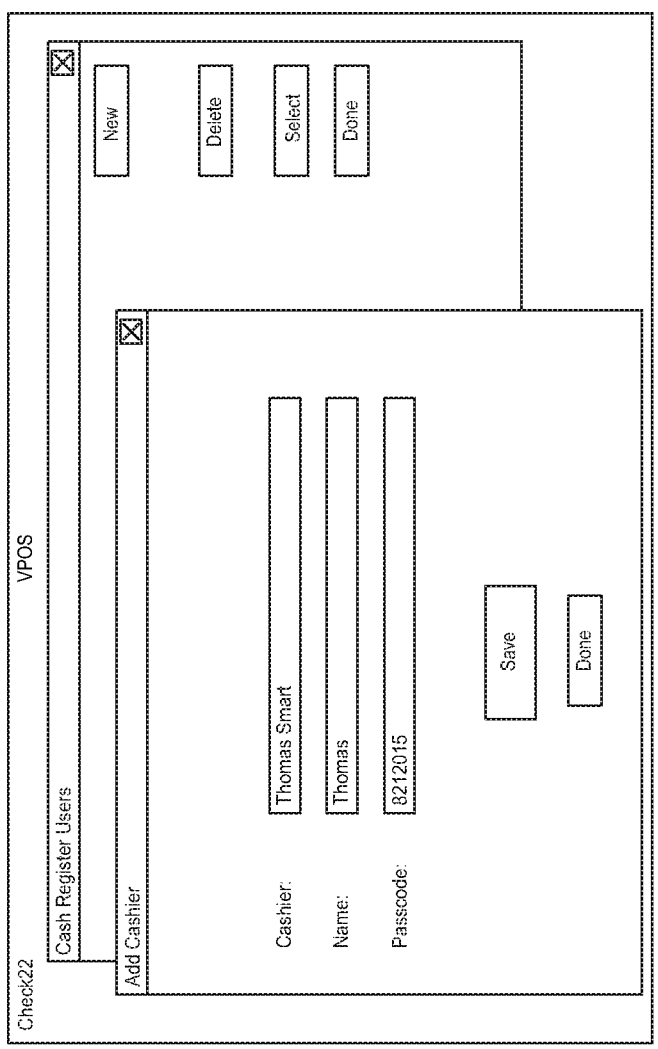
Figure 8:
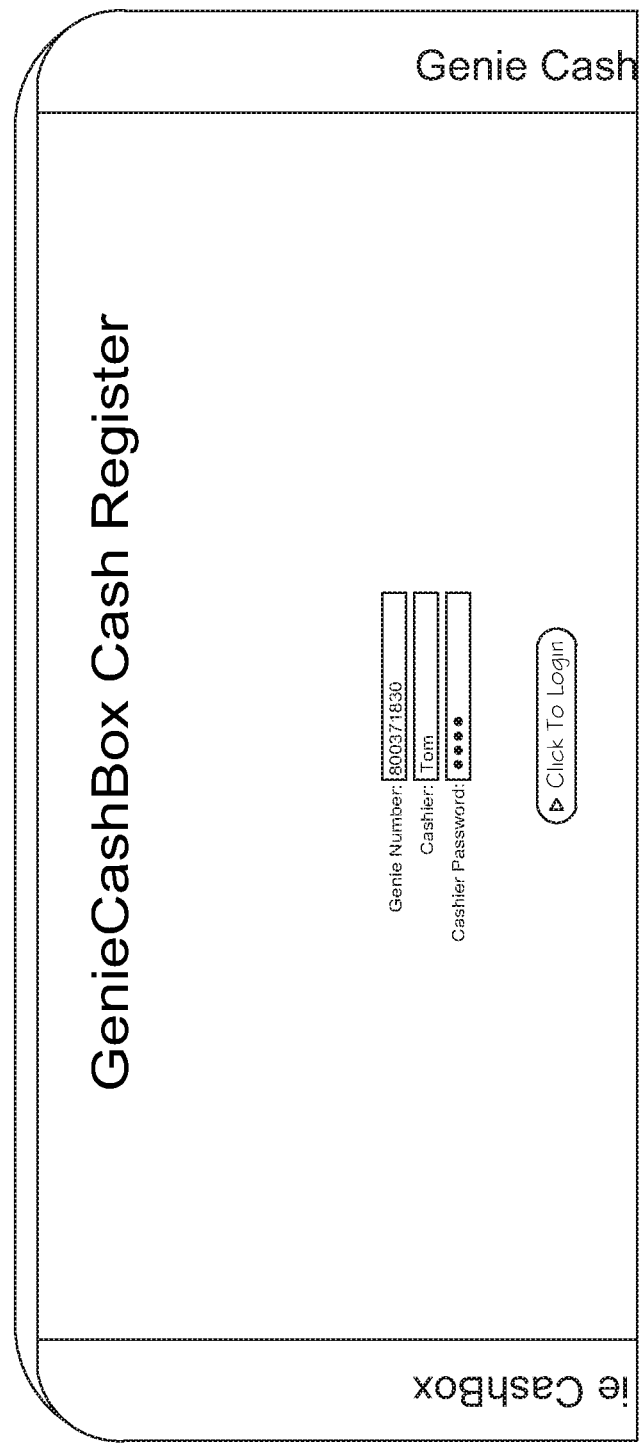
Figure 10:
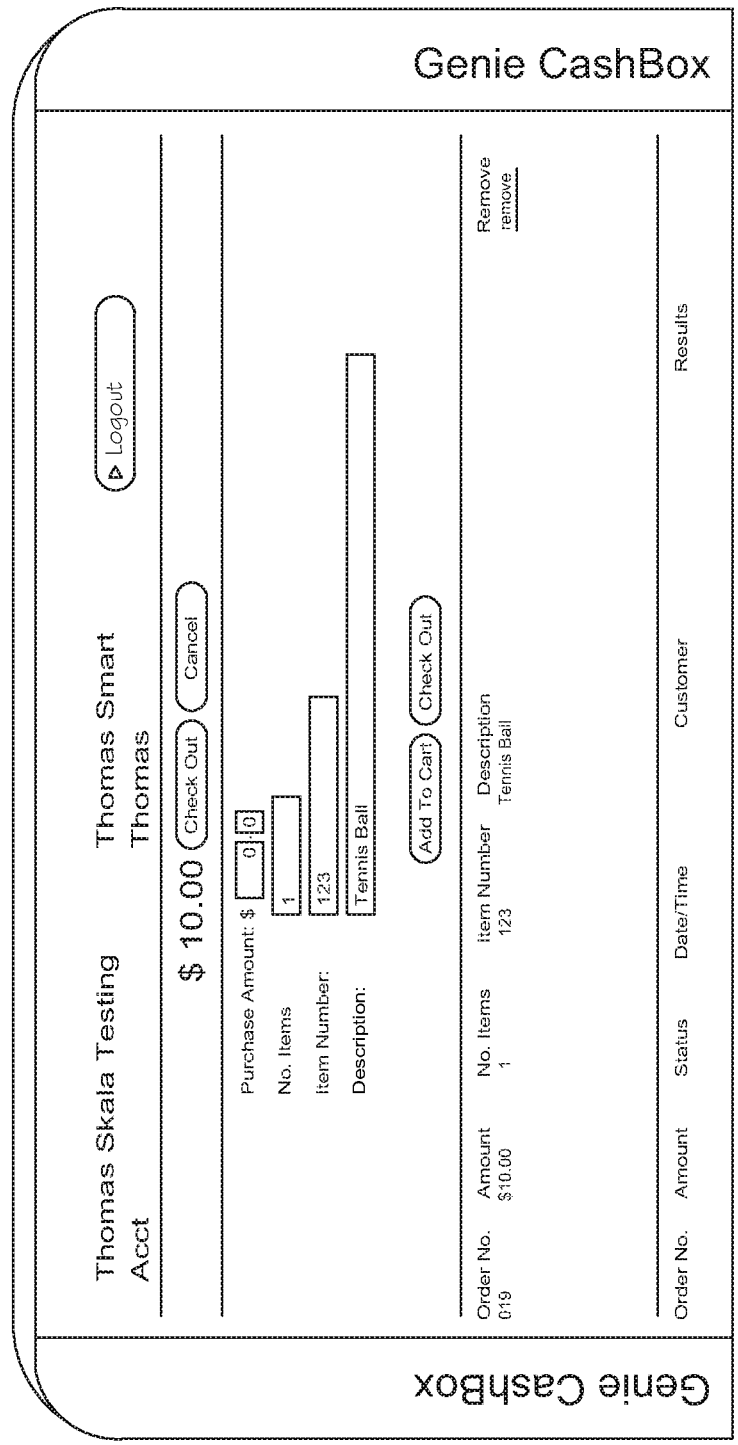
Figure 11:
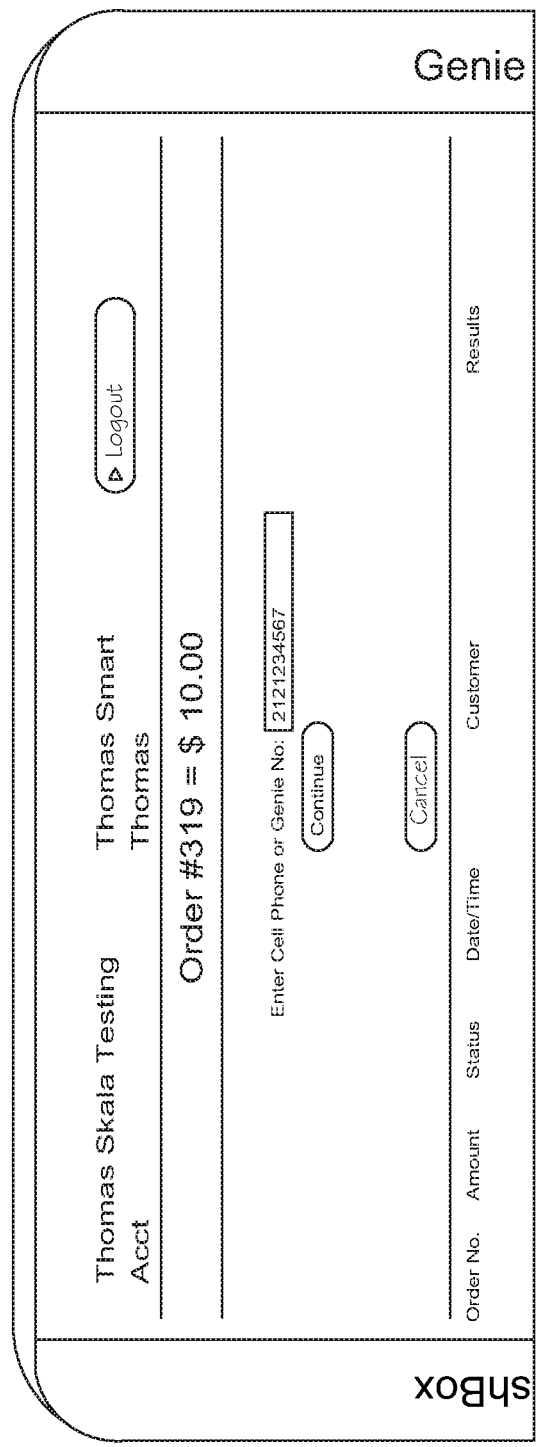
Figure 13:
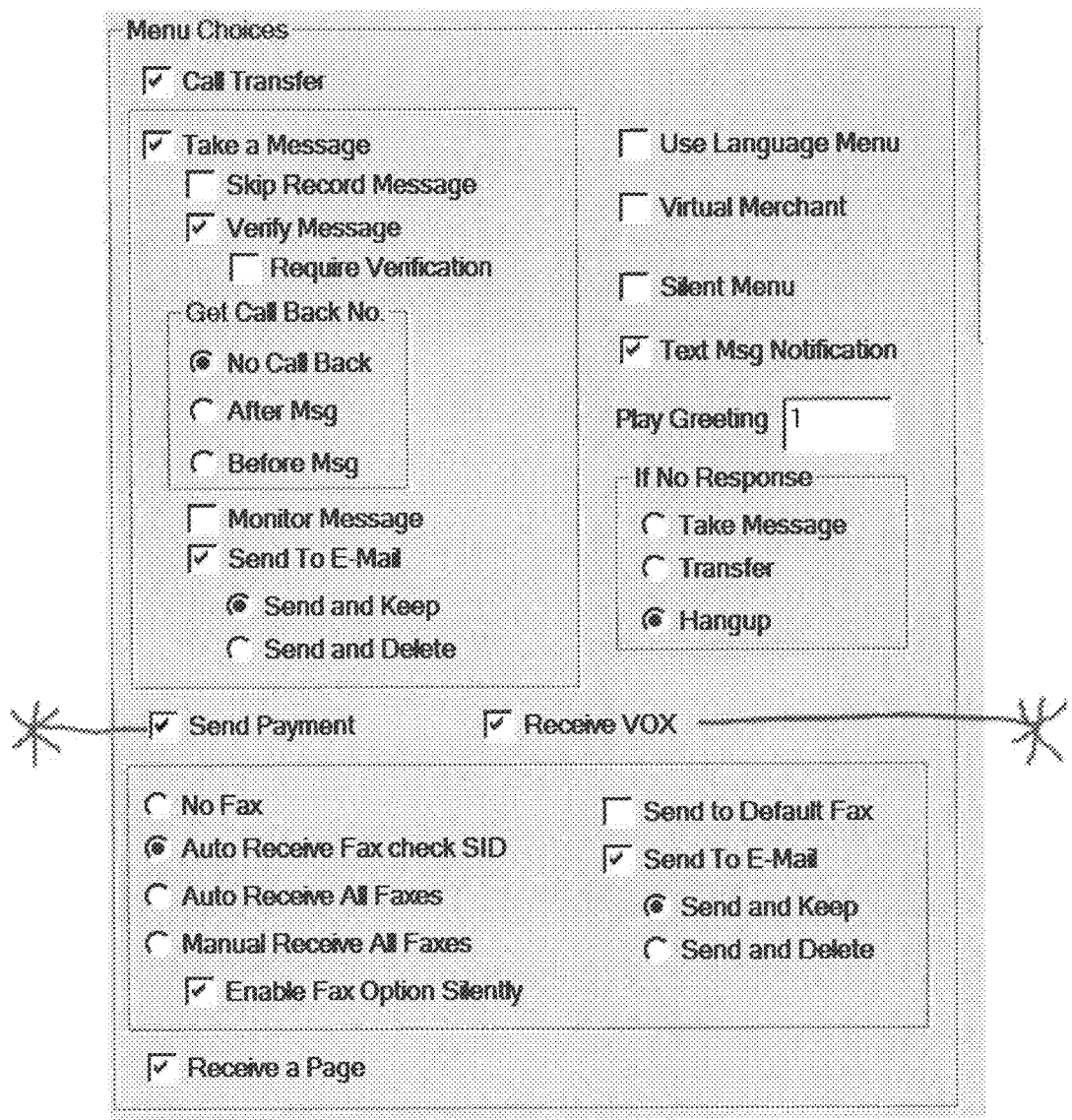

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Andriod, iOS, BSD, IBM z/OS, Windows Phone, Windows CE, Palm OS, Windows Vista, NT, 95/98/2000, OS X, OS2; QNX, UNIX; GNU/Linux; Solaris; MacOS; cable television operating system(s); and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, ATM, Cable Television, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a payment system according to one embodiment of the invention. The illustrated payment system 10 (called herein "Check22") includes a payer module 14, a requestor module 16, and an administration module 18, each functionally coupled together by a network 12. The illustrated payment system 10 is a "push" style payment system that allows for convenient automatic-style payments by creating a substitute check in electronic form that gets charged to a specific checking account at a specific bank and allowing a user to "push" that substitute check through the payment system in a manner that simulates the benefits of a "pull" (e.g. debit/grab) style payment system without the corresponding negative consequences.

The illustrated network 12 may include one or more networks and/or similar systems for distributed communications such as but not limited to the internet, cellular communications networks, cable tv/internet networks, ATM networks, local area networks, wide area networks, cloud data centers, and the like and combinations thereof. The network 12 advantageously allows for communication between the illustrated modules.

The illustrated payer module 14 includes a user interface module configured to allow for a payer to interface with the system 10 such that the payer can authorize "push" style payments directly and/or in response to request(s) made by the requestor module. The payer module may reside within and/or form part of and/or include one or more user interface devices, such as but not limited to smartphones, personal computers, tablets, laptops, smart watches, enterprise servers and the like and combinations thereof. The payer module includes a communication module sufficient to communicate of the network, such as but not limited to a wireless transducer, a network card, a cellular communication device, and the like and combinations thereof. Non-limiting examples of a payer module may be a payment module as described in U.S. Pat. No. 8,762,271, issued to Eliscu; or a transaction payment module as described in U.S. Pat. No. 7,865,430, issued to Kolls, which are incorporated for their supporting teachings herein.

The illustrated requestor module 16 include a user interface module configured to allow for a requester (e.g. merchant, vendor, government entity, broker) to interface with the system 10 such that the requester can request "push" style payments through the system from the payer(s) therethrough. Such requests may be associated with payment plans set up within the system such as but not limited to those associated with layaway consumer agreements, short-term lending, car/house payments, taxes, and the like and combinations thereof. The requester module may reside within and/or form part of and/or include one or more user interface devices, such as but not limited to smartphones, personal computers, tablets, laptops, smart watches, enterprise servers and the like and combinations thereof. The payer module includes a communication module sufficient to communicate of the network, such as but not limited to a wireless transducer, a network card, a cellular communication device, and the like and combinations thereof. Non-limiting examples of a requester module may be a receiver module as described in U.S. Pat. No. 8,108,278, issued to Gueorguiev et al., which are incorporated for their supporting teachings herein.

The illustrated requester module 16 may also include a payment processing module that facilitates in processing any received electronic substitute checks that may be provided by the system in response to a "push" notification by one or more payers. Such a payment processing module may include instructions, scripts, automated systems for performing one or more of the following: registering payment against an account, providing the substitute check to a bank for processing, acknowledging receipt of payment, debiting/crediting an account, and the like and combinations thereof. Non-limiting examples of a payment processing module may be a payment processing system as described in U.S. Pat. No. 8,438,064, issued to Berrio et al.; or a centralized payment processing system as described in U.S. Pat. No. 7,523,068, issued to Britney et al., which are incorporated for their supporting teachings herein.

The illustrated administration module 18 includes one or more modules that facilitate operation of the system such that requesters may request payments and payers may effect "push" style payments through the automated creation of electronic substitute checks drawn against specific accounts. Advantageously, the administration module 18 allows for tight control over the operation of the system while also allowing for great flexibility within the same, thus allowing the system to operate in a manner that provides great safety, speed, convenience, and security to payers and requesters. Non-limiting examples of an administration module may be an administration module as described in U.S. Patent Publication No.: 2010/0242051 by Roettger et al.; or an administrative module as described in U.S. Pat. No. 8,984,131, issued to Janssen et al., which are incorporated for their supporting teachings herein.

According to one embodiment of the invention, there is a Check22 system that may be a new proprietary suite of digital solutions designed to leverage several one or more interactive communication systems in order to change the collection, payment and settlement activities of lenders, merchants, commercial enterprises and service providers from the traditional grab/pull model to a new, friendlier and more acceptable method, the "push model".

To use a physical analogy, it may be viewed as moving from a model where we as consumers are required to hand a merchant our wallet, and allow them to take out the money for our purchases, to one in which we alone hold our own wallet, and we hand the merchant only the money we intend them to receive.

Wherein there is tight integration of a system for creating on-demand checking instruments with newly created management and organizational facilities of Check22 into a single, integrated Application Programming Interface (API), the Check22 system may solves several serious problems which currently plague merchants' collection efforts based on the grab model while giving their customers several new options for paying their obligations without sharing their financial information with anyone.

The Check22 system may be an interactive multipoint API, combining a suite of digital solutions, which fully integrate the services and database of a subscribing merchant/lender with AllCom's Genie CashBox, while giving individual subscribers the ability to create on-demand checking instruments accessing their off-platform DDA checking accounts, Check22 enable merchants and their customers or borrowers to seamlessly convert the practice of a "grab" model of the traditional "Check 21" system to the "push" model of the Check22 system. "Check 21," as used herein, relates to a US federal law commonly identified by that same name that was passed on Oct. 28, 2003 and allowed for substitute checks to be used to "pull" funds from bank accounts.

Through specific and selectable combinations of these features, Check22 may be tailored to suit the needs of three distinct communities of users: Merchants and Lenders—Businesses and individuals engaged in the selling of goods and services, including financial services; Agents—Sellers of communications and financial processing services to Merchants; and Consumers and borrowers.

This elegant solution may deliver one or more of these services with a single API, from a single source, on a single platform, and/or in a single cloud. The unique approach in this invention may be that information moves from process to process on the same platform, rather than from system to system—or even from provider to provider. This approach delivers faster, more tightly integrated services with security, privacy, and safety, at a lower cost than any multi-platform competitors.

A target system for the support and integration tools of the Check22 API may be AllCom's Genie CashBox, a unique e-wallet which uses a phone number (UPN) as the account number, and enables users to: store value and maintain a balance; send and receive peer-to-peer payments in real-time; create GenieChecks and Check22 on demand substitute checks online which may be used to making payments to anyone online, withdraw funds by cashing or depositing them in any bank account; email GenieChecks and Check22 on demand substitute checks to merchants, lenders and other recipients anywhere; and/or integrate with a Genie CashBox debit card enabling user to access their Genie CashBox funds through ATMs and anywhere the subject debit card may be accepted.

The Genie CashBox may be a robust e-wallet with debit card and checking features which operates as one unified solution. The invention revolves around the single-platform integration of the features listed above, and particularly the new Check22, and the special loading and use features, including but not limited to: cash; checks; bill pay; and/or retail and online establishments.

Check22 and the Genie CashBox may be designed to be accessed from any one or more of: internet enabled device; touch tone telephone; Automated Teller Machine; brick and mortar establishments; online merchant; and/or cable TV.

Finally, Check22 may be designed to fundamentally alter the merchant/consumer relationship as it exists today, by moving purchase and other financial transactions from a "pull" model, wherein a consumer gives a merchant detailed information allowing the merchant to draw money from a consumer's accounts, to a "push" model, where the consumer provides no such information to the merchant, but instead actively sends their payments directly to the merchant in the form of a Check22 on demand substitute check.

The Check22 API invention specifically extends this model into tightly controlled yet flexible integration with associating a customer's existing off-platform DDA checking account with their Genie CashBox and a merchant's commerce and their payment systems.

The Check22 system may help to change the relationship between consumers/borrowers and merchants/lenders from one in which merchants take money from consumers to one in which consumers give money to merchants, while preserving and even extending the benefits of automated transaction processing.

An intent of the Check22 system may be that the merchant/lender and the buyer/borrower will both be participants on the Genie CashBox (or other similar) platform. However, it may be that only the individual or business creating a Check22 instrument may be on the Genie platform. This will generally be the owner of the off-platform DDA checking account against which the Check22 instruments will be created and drawn.

Merchants who wish to take advantage of the management tools for integrating Check22 into their new or existing payment and collection systems will take advantage of the key features of the API which provide tools for the merchant to easily allow the customer to either automatically create a new CashBox account for themselves (if they do not have one), or to access their existing account if already established.

A key differentiator may be that the use of the API does not pass any account information to the merchant, nor allow the merchant in any way to access the customer's Genie CashBox account. Merchant may grab or pull payments, they may, in one embodiment, ONLY request a payment, using the tools provided on the Genie CashBox platform, which are processed but ONLY after the customer authorizes the requested payment.

The Check21 (and similar) methods for moving payments electronically from a consumer or borrower to a merchant or lender have been carried out under what may be described as a "pull" or "grab" model. In this method of transaction handling, the payer gives to the merchant some set of identifying information (credit card number, bank account routing numbers, etc.) along with some form of "authorization" statement. The merchant or lender then uses that information to submit a transaction against the payer's account to "grab" or "pull" the funds at times and in amounts of their choosing.

Several serious problems exist with this methodology:
1. Unverified Authorization—The authorization provided by the payer (signed receipt, "terms and conditions" buttons on websites, etc.) are not verified except retroactively, if and when a transaction may be challenged.
2. Incorrect or Multiple Postings—A Transaction may be posted for an incorrect amount, or may be submitted multiple times. As with authorizations, these problems may only be resolved retroactively.

3. Posting Against Insufficient Funds—A transaction may be posted against a bank account without sufficient funds or a credit account without sufficient available credit. Whether by inadvertence or intent by either party, this leaves the payer and the payee with losses from overdraft and credit exception fees.

Advantageously, in contrast, the various payment systems described herein solve one or more of these issues. In such systems, the merchant or lender, through the API, may provide information on where to send funds, rather than where to withdraw them. The payer may then create and/or complete payment transaction(s) from within their own account and thereby "push" the funds to the recipient. Benefits of such may include one or more of the following:

1. Authorization—The merchant has no authorization records to maintain. Authorization history may be completely within the control of the payer.
2. Incorrect or Multiple Postings—The amount of the transaction may be completely controlled by the payer. Each transaction may be individually registered.
3. Posting Against Insufficient Funds—As all transactions are processed only at the express authorization of the payer, the merchant may initiate any transaction against insufficient funds.

FIG. 2 is a module diagram for an administration module 18 according to one embodiment of the invention. The illustrated administration module 18 includes an account module, a communication module, a cash box module, an interactive communication module, a request processing module, and a substitute check module, each in communication with each other as needed to perform their various functions. Advantageously, the illustrated administration module 18 provides safety, security, control and flexibility for payers and requesters using the system.

The illustrated account module 20 is configured to allow for account setup for payers (e.g. See FIG. 3) and requesters, allows the same to link their accounts with the system to their bank accounts and/or other financial systems (e.g. credit cards, brokerage accounts), account management functionality (e.g. account preferences/setting) and the like and combinations thereof. The account module 20 may include corresponding structure with the payer and/or requester modules such that those modules may be used to gather required information and/or make selections needed by the account module. The account module will generally be primarily embodied as special purpose software resident on one or more servers. Non-limiting examples of an account module may be a user account management module as described in U.S. Patent Publication No.: 2002/0198892 by Rychel et al.; or a system as described in U.S. Patent Publication No.: 2012/0239563 by Csoka, which are incorporated for their supporting teachings herein.

The illustrated communications module 22 provides for communications amongst the modules and/or between the administration module and one or more other modules, such as but not limited to payer modules, requester modules, financial institutions, and the like. Generally such a module includes hardware and software required to communication over one or more networks. Such communication may be wireless, especially in regards to communications over a network, and/or may be wired and/or over a bus, such as may generally be found within a portable communication device. The communication module may also be configured to provide a secure method of communication over a computerized network. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supporting herein.

The illustrated cash box module 24 is configured to manage financial assets of users of the payment system. Such may include various methods for managing funds within the system above and beyond merely "pushing" substitute check information from a personal bank account to requestors such as but not limited to loading the system with funds so that the system can send substitute checks drawn on accounts owned/managed by the system for the benefit of those who are unbanked. The cashbox module may be configured to perform one or more of the following non-limiting functions: manage funds, receive funds, distribute funds, manage virtual currency, interoperate with other financial systems (e.g. credit cards, bank accounts, brokerage accounts, investment accounts), and the like and combinations thereof. Non-limiting examples of a cash box module may be a financial system as described in U.S. Patent Publication No.: 2002/0087443, by Williams et al.; or a system as described in U.S. Patent Publication No.: 2012/0254002, which are incorporated for their supporting teachings herein.

The illustrated interactive communications module 26 may be configured to access and/or include one or more of the features of an interactive communications module and/or system as described in US Patent Application No. 20130259028 by Skala, published Oct. 13, 2013, which reference is incorporated herein in its entirety. Such a module may nest or otherwise connect/integrate the Check22 system within or to a communications system that provides additional benefits to its users, such as but not limited to convenient communications, information privacy, tools for automated communications including but not limited to automated website building, and the like and combinations thereof.

The illustrated request processing module 28 is configured to process requests from requester module(s) and/or pass them to payer module(s) for payment. The requester module may perform one or more of the following non-limiting steps: register a request, compare a request to a standard, forward a request to a payer module, format a request to a protocol, check request credentials, modify a request, delay a request, and the like and combinations thereof. The request processing module may serve as a request hub, filter, data storage, relay and/or the like and combinations thereof. The request processing module may include one or more of a processor, a database/data storage module, and/or may operate according to one or more scripts, functions and the like and combinations thereof. Non-limiting examples a request processing module may be a processing module as described in U.S. Pat. No. 8,831,220, issued to McCown et al.; or a data-processing module as described in U.S. Pat. No. 8,649,420, issued to Lin, which are incorporated for their supporting teachings herein.

Figure 23:
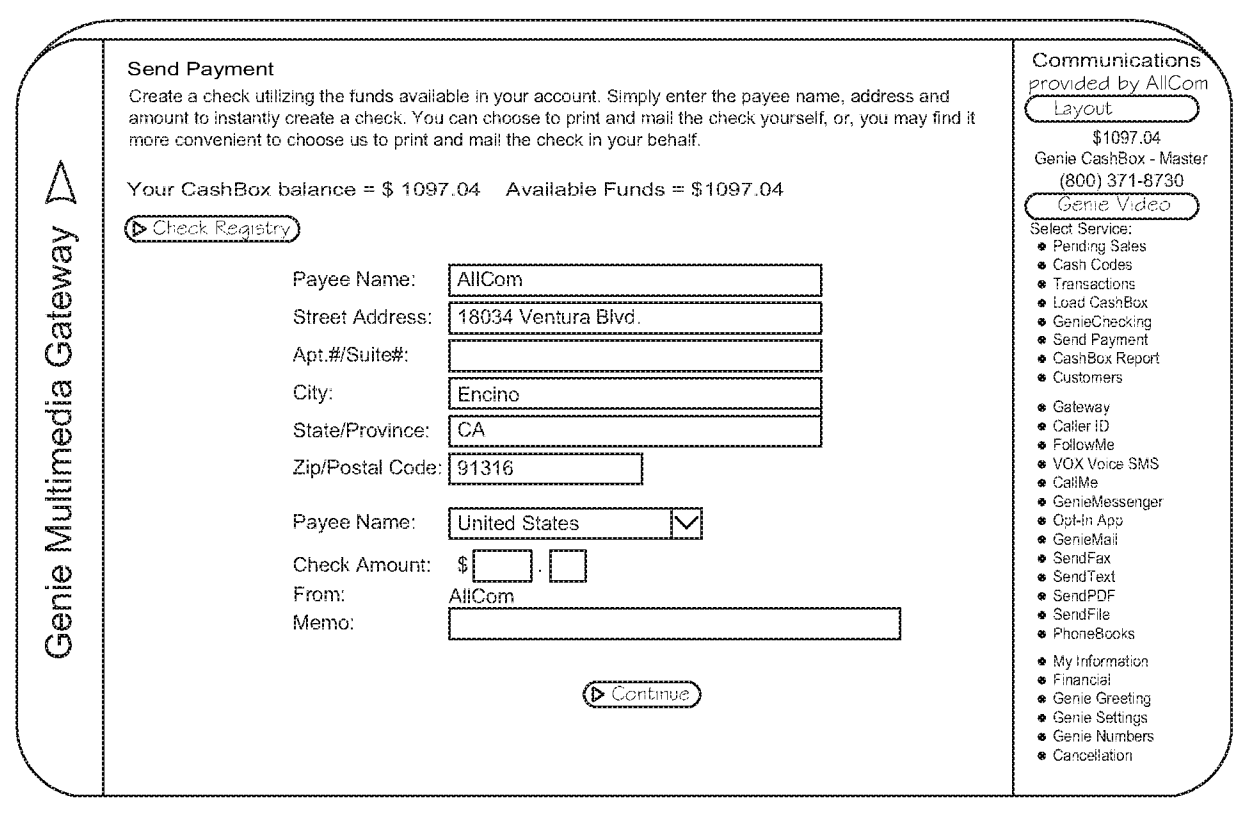

The illustrated substitute check module 30 is configured to generate and/or manage electronic substitute checks. Such a module may take information provided by one or more of a payer, requester, and/or a financial institution and use that information to generate a valid substitute check in electronic form. Such an electronic form may include a visual representation of a check and may include information gathered using one or more user interface devices (see FIGS. 23 and 24). The visual representation of the check may be deposited by the requester in various methods, including but not limited to using a smartphone app to photograph the check and deposit the same through the app, printing the check and depositing the check in person at a bank, and/or requesting that the Check22 system print and mail the check to a recipient for deposit as a normal check. Non-limiting examples of a substitute check module may be a payment module as described in U.S. Patent Publication No.: 2014/0046840; or an electronic payment system as described in U.S. Pat. No. 8,401,966, issued to Stewart et al., which are incorporated for their supporting teachings herein.

An administration module may include one or more of the modules described herein and/or may include one or more modules that include one or more of the functions, features, benefits, advantages, processes, operations, and the like described herein. Non-limiting examples of an administration module may be an administration module as described in U.S. Patent Publication No.: 2011/0125900, by Janssen et al.; or an administration module as described in U.S. Patent Publication No.: 2008/0091790, by Beck, which are incorporated for their supporting teachings herein.

Figure 3:
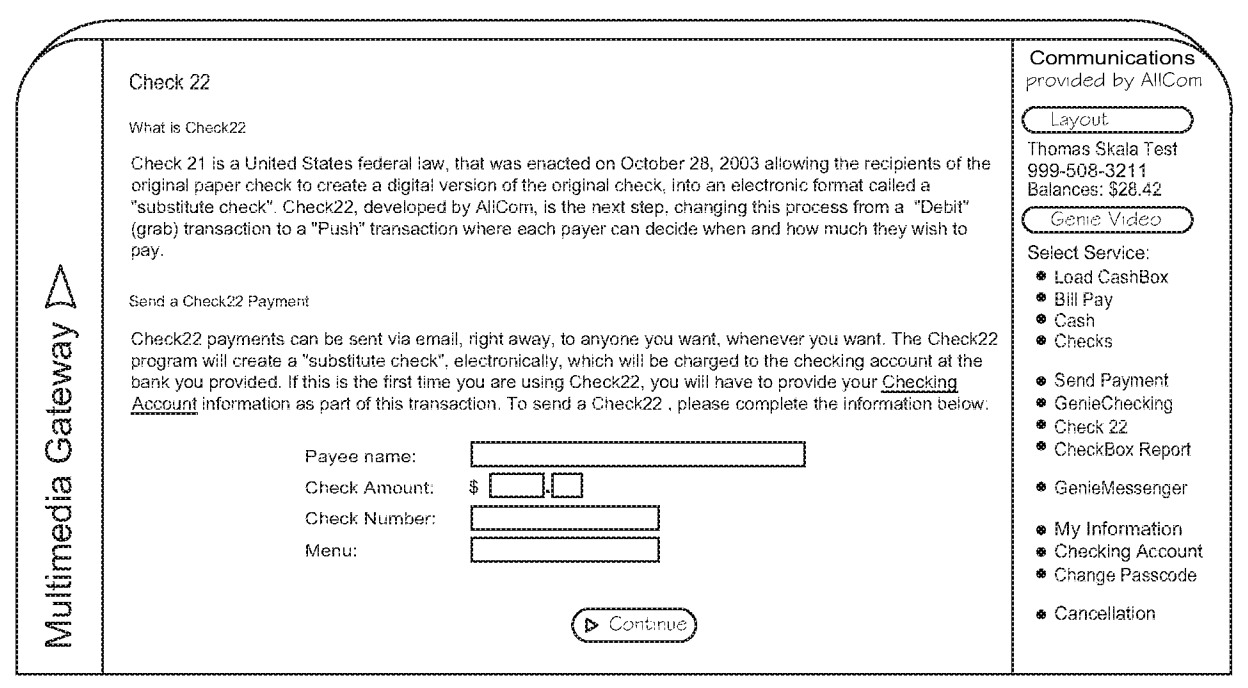

Looking at FIG. 3, there is shown an exemplary Check22 user interface for use by a payer. A Check22 Interface may be a specific API integrating the customer's off-platform DDA checking account into the substitute check creation process, which may be completed in less than a minute, including one or more of the steps of:

1. Automatically create a Genie CashBox Account for new customers/borrowers.
2. Allow a customer to configure the connection from the off-platform DDA checking account into their newly created Genie CashBox. (Only required in the initial setup.)
3. Once the customer's Genie CashBox has been loaded, enable the customer to disperse funds to any payee through the creation of a substitute check.
4. Send the customer a text message with an email backup confirming their Check22 transaction, including the check number, dollar amount, payee name, etc.

Returning customers may use the features of the Payment Interface by logging in with their Genie Number, or cell number and their passcode.

The Check22 system is intended to change the relationship between consumers/borrowers and merchants/lenders from one in which merchants take money from consumers to one in which consumers give money to merchants, while preserving and even extending the benefits of automated transaction processing.

An intent of the Check22 system is that the merchant/lender and the buyer/borrower will both be participants on the Genie CashBox platform. However, only the individual or business creating a Check22 instrument must be on the Genie platform. This will always be the owner of the off-platform DDA checking account against which the check 22 instruments will be created and drawn.

Merchants who wish to take advantage of the management tools for integrating Check22 into their new or existing payment and collection systems will take advantage of the key features of the API which provide tools for the merchant to easily allow the customer to either automatically create a new CashBox account for themselves (if they do not have one), or to access their existing account if already established.

A key differentiator is that the use of the API does not pass any account information to the merchant, nor allow the merchant in any way to access the customer's Genie CashBox account. Merchant cannot grab or pull payments, they can ONLY request a payment, using the tools provided on the Genie CashBox platform, which are processed but ONLY after the customer authorizes the requested payment.

Traditional methods for moving payments electronically from a consumer or borrower to a merchant or lender have been carried out under what is described as a "pull" or "grab" model. In this method of transaction handling, the payer gives to the merchant some set of identifying information (credit card number, bank account routing numbers, etc.) along with some form of "authorization" statement. The merchant or lender then uses that information to submit a transaction against the payer's account to "grab" or "pull" the funds.

Several serious problems exist with this methodology for both the payer and the payee.

Risks to the Payer may include one or more of the following:

1. Unverified Authorization—The authorization provided by the payer (signed receipt, "terms and conditions" buttons on websites, etc.) are not verified except retroactively, if and when a transaction is challenged.
2. Incorrect or Multiple Postings—A Transaction may be posted for an incorrect amount, or may be submitted multiple times. As with authorizations, these problems can only be resolved retroactively.
3. Posting Against Insufficient Funds—A transaction may be posted against a bank account without sufficient funds or a credit account without sufficient available credit. Whether by inadvertence or intent by either party, this leaves the payer and the payee with losses from overdraft and credit exception fees.

Risks to the Payee may include one or more of the following:

1. No Risk Management—Processing a payment based on only of the payer's representation is risky, payments can be charged back for many reasons.
2. Unverified Payers—Not verifying the identity payer and their payment profile from reliable sources often produce disappointing results.
3. Unverified History—Not verifying a payer's current status and their payment history, in a similar fashion as when verifying a credit card payment, leaves the payee in a risky position. Whether by inadvertence or intent by the payer, this leaves the payee with losses from overdraft and credit exception fees.

In contrast, the "push" model, as embodied in the Check22 system, solves these issues. The merchant or lender, through the API, provides information on where to send funds, rather than where to withdraw them. The payer then creates and completes the payment transaction from within their own account and "pushes" the funds to the recipient.

1. Authorization—The merchant has no authorization records to maintain. Authorization history is completely within the control of the payer.
2. Incorrect or Multiple Postings—The amount of the transaction is completely controlled by the Payer. Each transaction is individually registered.
3. Posting Against Insufficient Funds—As all transactions are processed only at the express authorization of the payer, the merchant cannot initiate any transaction against insufficient funds.

A Check22 system may solve one or more security issues by including a process of one or more risk management steps using a risk management module, that may be performed in real-time, including but not limited to: a local Negative File Test, a Velocity Test, a National Bank Database Verification, a Text Message confirming each payment with the payer, and recording the name and the purpose of each payment, in the payer's voice, which is attached as a WAV file to each payment sent. The following steps, while comprehensive, may be performed on an interactive communications system, and may be performed in real-time, usually taking about 30 seconds.
1. Negative File Test—Genie Gateway maintains its own real-time Negative File, storing information on all customer problem transactions which resulted in a loss. Before a Check22 is issued the payee must clear the Negative File Test
2. Velocity Test—Genie Gateway maintains a real-time velocity program, monitoring customer transactions by day, by week and by month. The Velocity Test enables the Risk Management team to assign an acceptable dollar amount and the number of Check22 payments, on a daily, weekly and monthly basis, to manage acceptable risk from any specific customer or group of customers. Before a Check22 is issued it must first pass the Velocity Test.
3. National Bank Database Test—As part of the Check22 verification process, Genie Gateway accesses the national database of US Banks to verify each Check22, including but not limited to verifying with the issuing bank the routing and checking account numbers, the name and status of the subject account of the subject off platform DDA account against which the Check22 is drawn. Before a Check22 is issued, Genie Gateway must receive confirmation from the bank that their information matches the information submitted.
4. Text Message Confirmation—As part of the Check22 verification process, Genie Gateway sends the payer a text message to confirm that they authorized the subject Check22. The confirmation is a simple YES or NO question. If the answer is YES, the Check22 is issued. If the payer answers no, or does not reply within a specified time, no Check22 is issued.
5. WAV Recording Confirming the Purchase—As a convenience to the merchant, when a Check22 is requested by phone, Genie Gateway records the payer's name, and the purpose of their payment, and attaches those recording as a WAV file to the same email that is used to send their Check22. The recorded information can be retained indefinitely by the merchant, and referred to in case of a misunderstanding or a dispute.

A Check22 Interface may be a specific API integrating the customer's off-platform DDA checking account into the substitute check creation process, which can be completed in less than a minute, which may include one or more of the following within the system:
1. Automatically create a Genie CashBox, with a Genie-Checking Account and Check22 features for new customers/borrowers.
2. Allow a customer to configure the connection from the off-platform DDA checking account into their newly created Genie CashBox. (Only required in the initial setup.)
3. Once the customer's Genie CashBox has been loaded, enable the customer to disperse funds to any payee through the creation of a GenieCheck, (a substitute check).
4. If the customer's Genie CashBox has not been loaded, enable the customer to disperse funds to any payee through the creation of a Check22, drawn against their off platform DDA checking account.
5. Send the customer a text message with an email backup, requesting to confirm their Check22 transaction, including the check number, dollar amount, payee name, etc.
6. Automatically send the payee, via email, the Check22, or the GenieCheck, as created by the customer.

Looking to FIGS. 4-7, a Check22 API may include a Virtual Point Of Sale (VPOS) method, which may allow a subscriber to designate multiple Cashiers, each of who can independently operate a Cashier Cash Register Interface through a web interface, connecting that Cashier to a designated subset of the Check22 processing functionality.

Features of a Cashiers Cash Register Interface may include one or more of the following:
1. Individual Cashier name and passcode
2. Separate email address for receiving Check22 payments, distinct from that of the managing subscriber.
3. Ability to accept payments from existing customers.
4. Ability to set up new customers and accept payments.
5. No ability to move funds within the system or withdraw funds through the various payment methods of the platform, without management's approval.

Figure 14:
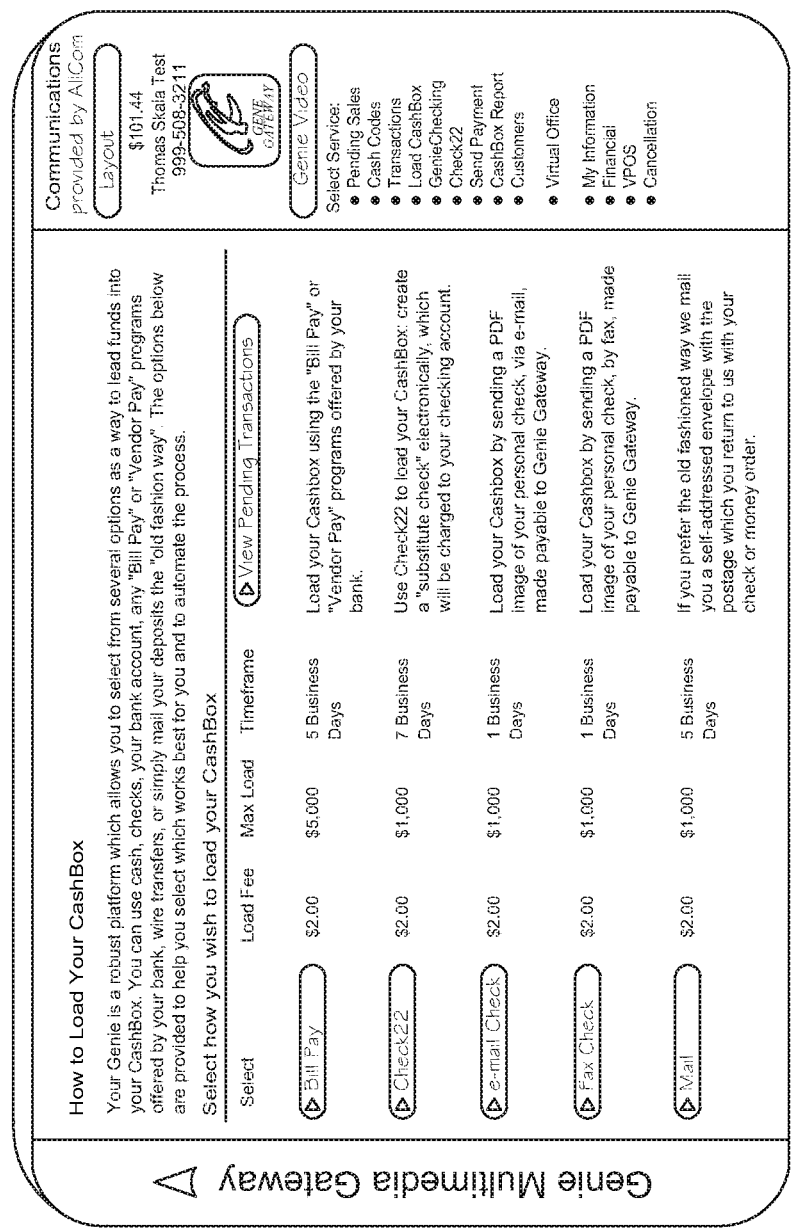
Figure 15:
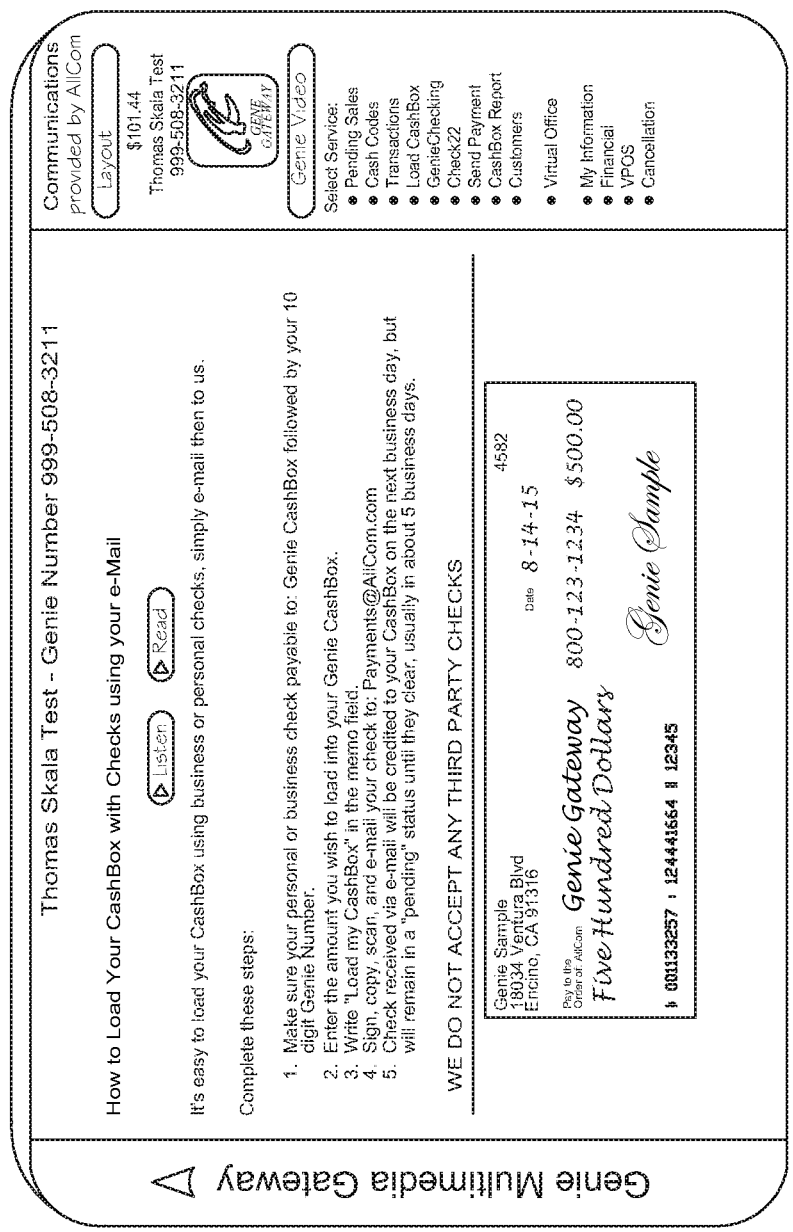
Figure 16:
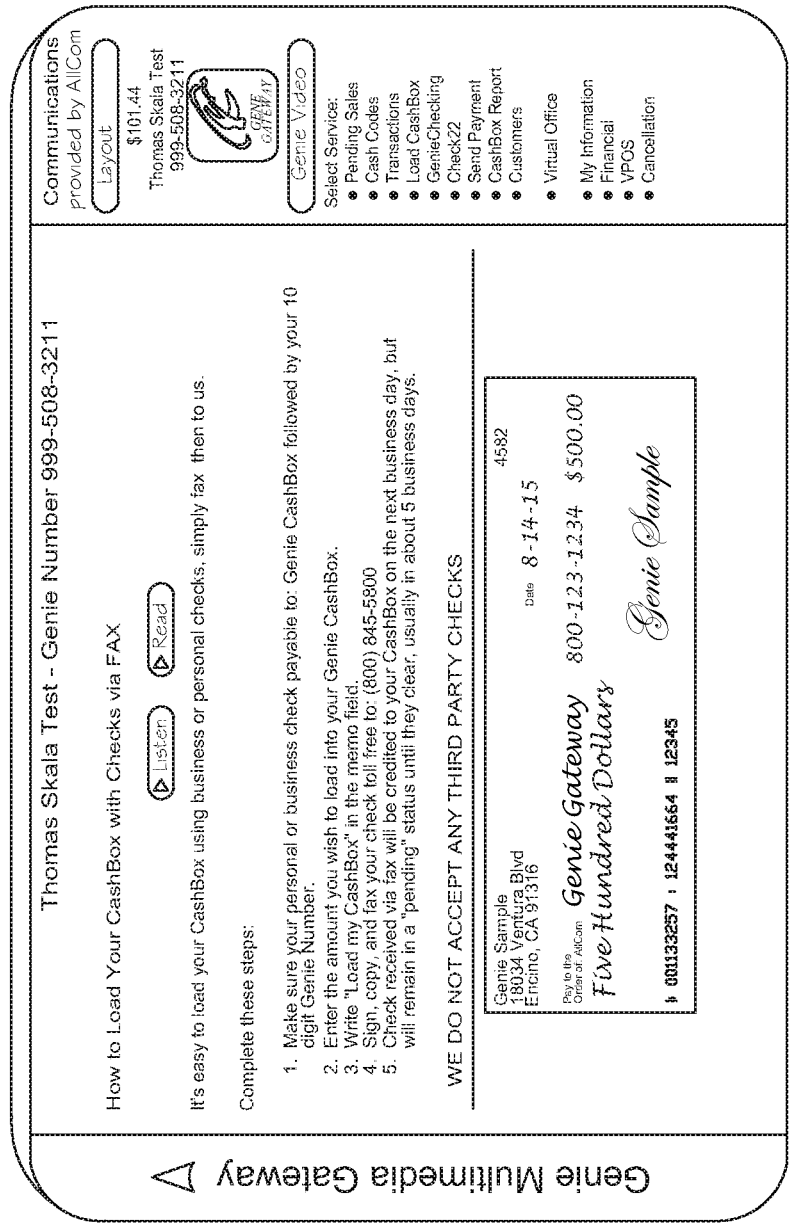

When a new customer of a subscribing merchant first wishes to pay the merchant using the Check22 API, one or more of the following steps occur within the system:
1. The merchant or merchant's Cashier gathers and enters the following information:
   a. First and Last Name
   b. Cell Phone Number
   c. Email Address
   d. Bank Routing Number
   e. Checking Account Number
2. A series of real-time security checks, including:
   a. System-internal database of existing customers
   b. System-internal Bad Accounts list
   c. External database of US Bank Accounts
3. If the system determines this is an existing customer, processing shifts to the Returning Customers methods
4. If base security checks on a new customer pass, the customer is sent a text message requesting approval of the transaction and amount
5. If the customer approves the transaction by return text
   a. A new user account is created within the system for the new customer
   b. A Check22 substitute check instrument is created for the transaction
   c. The appropriate amount is credited to the merchant's CashBox account Looking to FIGS. 8-13, Merchants may select the option to have the subject Check22 payments automatically emailed directly to them, for deposit, directly to their off platform bank account. Generally in such a process:
   d. A merchant is informed to complete the sales transaction
   e. Email notifications are sent to both the merchant and the customer with details of the transaction When a previous customer returns to do repeat business with a subscribing merchant using the Check 22 API, one or more of the following steps occur within the system:
1. The merchant or merchant's Cashier enters the customer's cell phone number or Genie Account number
   a. First and Last Name
   b. Cell Phone Number
2. A series of security checks, including:
   a. System-internal database of existing customers
   b. System-internal Bad Accounts list 3. If the system determines this is NOT an existing customer, processing shifts to the New Customers methods
4. If base security checks on an existing customer pass, the customer is sent a text message requesting approval of the transaction and amount
5. If the customer approves the transaction by return text
   a. The customer's Genie CashBox account is checked, to determine if there is a sufficient balance to cover the present transaction
   b. If there is a sufficient balance, the amount of the transaction is transferred from the CashBox of the customer to the cashbox of the subscribing merchant.
   c. If there is not a sufficient balance
      i. A Check22 substitute check instrument is created for the transaction
      ii. The appropriate amount is credited to the merchant's CashBox account
   d. The merchant is informed to complete the sales transaction
   e. Email notifications are sent to both the merchant and the customer with details of the transaction
6. Merchants may select the option to have the subject Check22 payments automatically emailed directly to them, for deposit, directly to their off platform bank account Looking to FIG. 14-16, a Check22 API may introduce one or more of the following extensions to methods of loading funds into a subscriber's or customer's Genie CashBox:
1. Direct Check22—In this method, the customer or subscriber directly enters the bank routing and account information into the Genie CashBox user interface, in similar fashion to that described above. That information is than used to create an appropriate substitute check for debiting the customer's off platform DDA checking account.
2. FAX Check—Using the FAX method, the subscriber or customer does one or more of the following:
   a. Makes their personal check out to "Genie Gateway", followed by their 10 digit Genie Number
   b. Writes "Load my CashBox" in the Memo field
   c. Makes out the remainder of the check as normal
   d. Signs the check
   e. Faxes the check to the designated fax number shown to them in the CashBox user interface
3. Email Check—Using the Email method, the subscriber or customer does one or more of the following:
   a. Makes their personal check out to "Genie Gateway", followed by their 10 digit Genie Number
   b. Writes "Load my CashBox" in the Memo field
   c. Makes out the remainder of the check as normal
   d. Signs the check
   e. Scans the check with a computer-attached scanner
   f. Emails the scanned check to the designated email address shown to them in the CashBox user interface Checks received through the Fax and Email methods, including but not limited to one or more of the following steps and/or restrictions:
1. Must be from a checking account belonging to the customer or subscribing merchant. No Third Party checks can be processed by Genie Gateway.
2. Must be made out correctly as described
3. Will be used to generate an appropriate substitute Check22 for submission to the issuing bank
4. Funds will be credited to the subscriber or customer's CashBox on the following business day
5. Funds will be listed in a "pending" state until the substitute instrument clears the issuing bank.

Figure 17:

Looking to FIG. 17, a Check22 API may include an extension to the previously introduced Genie CashBox Debit Card. The new Genie CashBox Check22 Debit Card system/card is an instrument similar to a traditional stored value debit instrument and made to be used at retail environments, online, via the telephone, on cable TV, or with VPOS terminals at most merchants.

According to one embodiment of the invention, a Genie CashBox Check22 Debit Card may offer maximum privacy and/or security, as it contains ONLY the cardholder's 10 digit Genie Number, without a name or any of their personal or financial information. If lost or stolen, it will be useless as each attempt to make purchase automatically requires a text message confirmation, from the cardholder's specific cell phone, to approve said purchase. Without a confirming text reply by the cardholder all attempts to use will be declined.

Check22 may extend the Genie CashBox Debit Card in one or more of the following manners and/or may operate according to one or more of the following steps:
1. A transaction made with the debit card is first checked against the available funds in the card-holder's Cash-Box account (the "stored value")
2. If sufficient funds exist to complete the transaction, the funds are transferred immediately.
3. If sufficient funds are not present to cover the transaction, the system sends a text to the customer's cell phone, requesting permission to complete the transaction using a Check22 against the customer's off-platform checking account.
4. If the customer declines the request, or does not reply in a pre-determined amount of time, the transaction is terminated.
5. If the customer approves the request, the system prepares an appropriate Check22 substitute check against the customer's off-platform checking account.
6. Funds are then transferred immediately as appropriate to complete the transaction.

Returning customers may use one or more features of a Payment Interface by logging in with their Genie Number, or cell number and their passcode.

The Check22 system may allow a customer or borrower to make a payment to a subscribing merchant, lender or any other payee, by creating a substitute check, as described by the existing Check 21 legislation.

When the customer specifies a payment by Check22, the interface created by the API may prompt them for the name of the payee, the dollar amount of the payment and/or a description, where they may specify information such as an invoice number, etc.

Figure 18:
Figure 19:
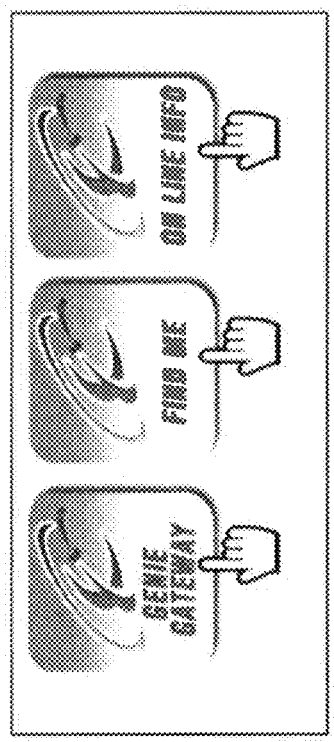
Figure 20:
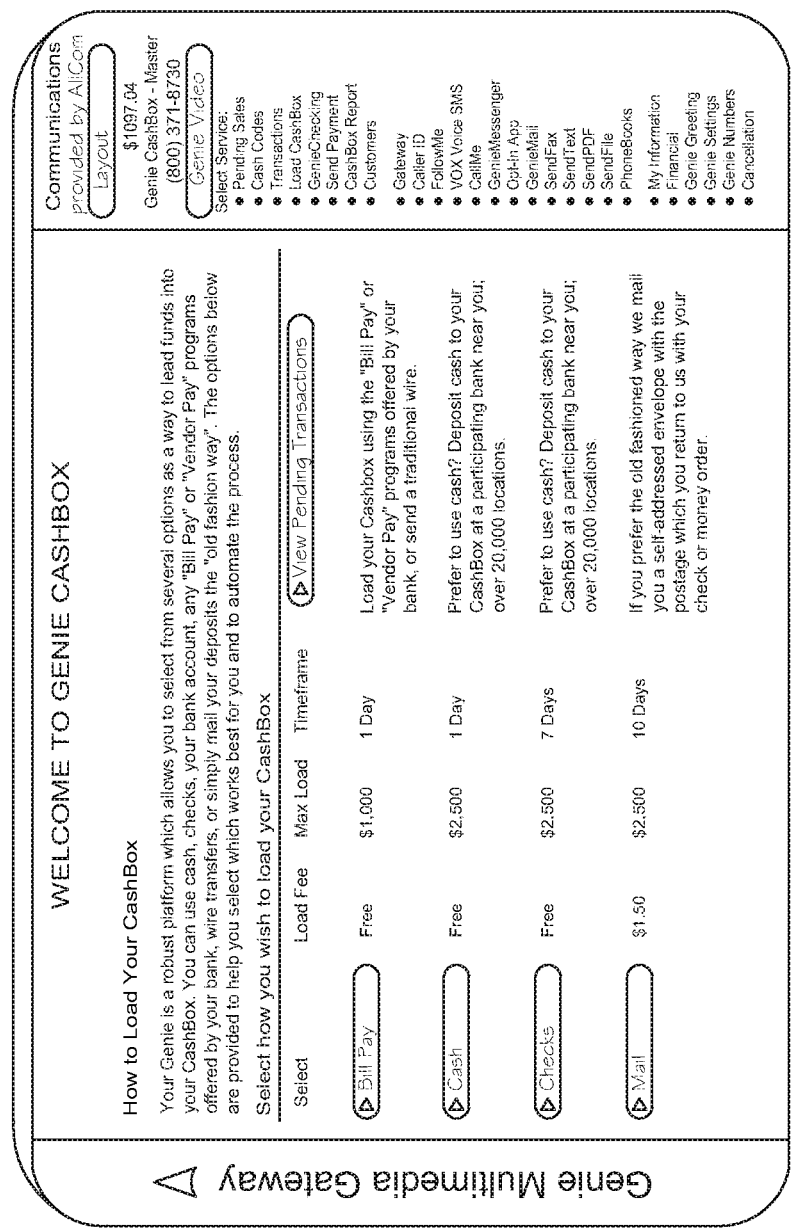
Figure 22:
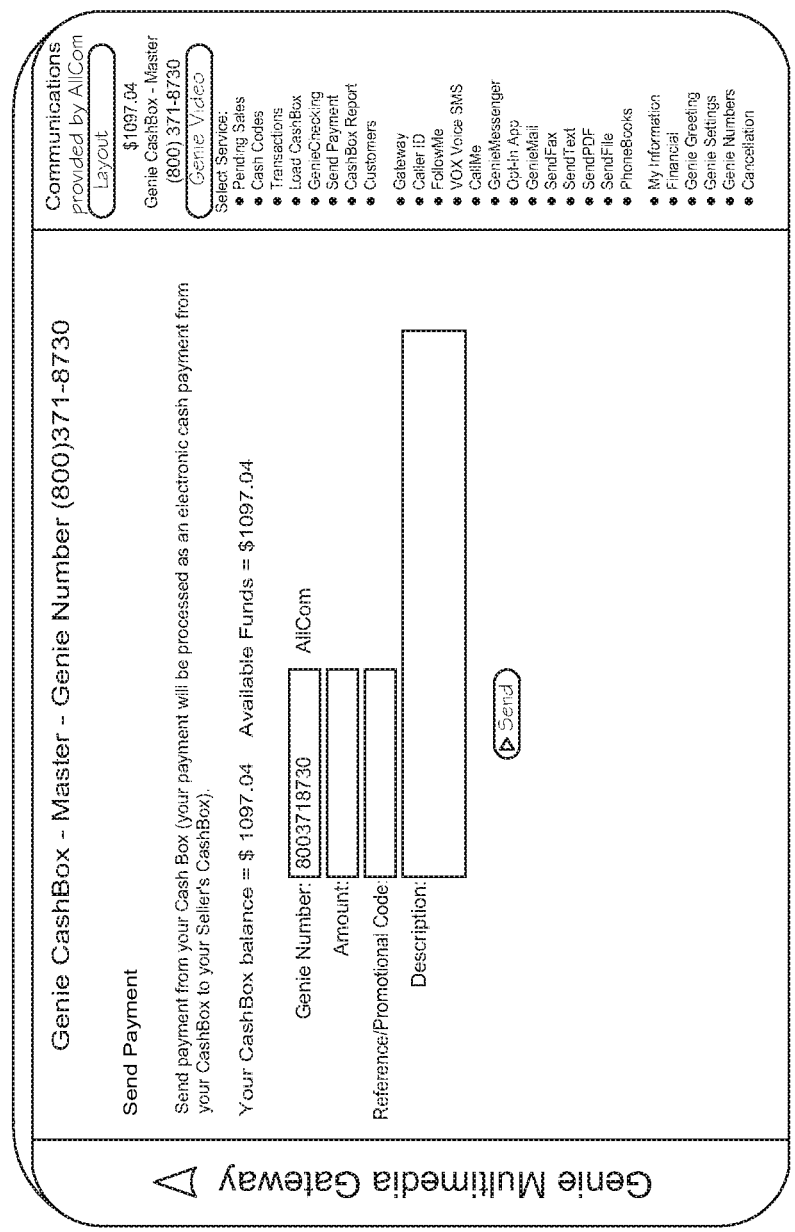

Looking to FIG. 18, a system may then prepare a printable substitute check(s), including all the required and relevant information. This check may be handled in any of several ways, including but not limited to being:
Printed and Deposited at any financial institution
Printed and Delivered to the payee by mail or in person
Printed and Deposits by PC or Smartphone app
Emailed to the payee
The receiving Payee may then
Print and Deposit at any financial institution
Print and Deposit by PC or Smartphone app One of the key purposes of a Check22 system is to replace the existing system of automatic, recurring "grab" transactions currently employed by many merchants and lenders under the current system of "Check 21" substitute check creation.

As previously discussed, the commonly existing systems create numerous problems, including among others:
Creation of substitute checks with questionable or out of date authorizations.
Creation of substitute checks in amounts or at times not intended by the payer.
Frequent processing of substitute checks against insufficient funds, creating large NSF fees for all participants. Repeated occurrences often result in account closures.

The use of the electronic verification methodology in the invention precludes all anticipated fraudulent uses, including but not limited to: alteration to the check prior to presentation, presentation by unintended parties and multiple presentation of the same instrument through parallel channels.

A Check22 system may allow a customer or borrower to make a payment to a subscribing merchant, lender or any other payee, by creating a substitute check, as described by the existing Check 21 legislation.

When the customer specifies a payment by Check22, the interface created by the API prompts them for the name of the payee, the dollar amount of the payment and a description, where they may specify information such as an invoice number, etc.

The system then prepares a printable substitute check, including all the required and relevant information. This check may be handled in any of several ways, including but not limited to one or more of: Printed and Deposited at any financial institution; Printed and Delivered to the payee by mail or in person; Printed and Deposits by PC or Smartphone app; Emailed to the payee; The receiving Payee may then; Print and Deposit at any financial institution; and/or Print and Deposit by PC or Smartphone app.

One of the key purposes of the Check22 system may be to replace the existing system of automatic, recurring "grab" transactions currently employed by many merchants and lenders under the current system of "Check 21" substitute check creation.

As previously discussed, the commonly existing systems create numerous problems, including among others:
Creation of substitute checks with questionable or out of date authorizations.
Creation of substitute checks in amounts or at times not intended by the payer.
Frequent processing of substitute checks against insufficient funds, creating large NSF fees for all participants. Repeated occurrences often result in account closures.

To solve this problem, the Check22 system may include a system for scheduling payments with automated reminders and authorization processes, designed to enable merchants to request and receive Check22 payments from any number of customers, from a handful to thousands.

In one non-limiting embodiment, a merchant uses the Check22 API to manually or automatically interface their customer records with the Check22 Genie infrastructure. The merchant sends to Genie a list of payers in the Check22 program, along with amounts and transaction descriptions, at some time (e.g. three days) before the scheduled payment.

Each of that merchant's customers, who have an account on the Genie platform, then receives a series of reminder messages in advance of each scheduled payment.
Text reminder—The payer gets a text message on their smart phone, reminding them that they have a scheduled payment coming due. The text message includes the amount scheduled, the Payee name and the scheduled date. If the payer agrees they may respond by clicking on the "OK" link. If the payer wishes to authorize the payment, they need only reply to the text with by clicking on OK. The system then prepares the appropriate Check22 substitute check, delivers it to the payee, and emails the payer a record of the transaction.
Email reminder—If the payer did not authorize the payment through the text message, they will receive an email message, with a more detailed reminder. As with the text message, the payer may authorize the payment by clicking on the "OK" link. If authorized, the system then prepares the appropriate Check22 substitute check, delivers it to the payee, and emails the payer a record of the transaction.
Phone reminder—A final reminder may be automatically sent by telephone. Again, the payer may be told the date, amount and Payee of the scheduled payment, and given the opportunity to approve the payment. If the payer authorizes the payment, the system then prepares the appropriate Check22 substitute check, delivers it to the payee, and emails the payer a record of the transaction.
The payer may receive these notifications simultaneously, or over a period of time. Regardless, the payer may authorize the payment in response to any of the reminders, as they choose.

If the payer does not authorize the transaction by the scheduled date, the scheduled payee may be notified that the payer has not authorized the payment. The merchant may then proceed to additional collection actions or changes to services proved, as appropriate.

At each step of the process, the payer may be reminded to ONLY authorize the payment if they have sufficient funds in their off-platform DDA checking account to cover the transaction. This greatly reduces the likelihood of substitute checks being processed against insufficient funds, as so commonly occurs under the current common systems.

With the Check22 reminder system, the payer may be protected from unintended transactions as well as having a clear record of each individual authorization action. Conversely, the merchant payee may be alerted to collection issues much earlier, and with minimal risk that insufficient funds in a payer's account will result in loss through fees, and even account closures on their merchant accounts.

As noted, once set up, the process of creating Check22 instruments, handling bulk schedule requests, notifying payers of scheduled payments, etc. may take place within a payment system which may be part of a larger interactive communication system. Such eliminates inter-platform delays and inconsistencies that plague multi-platform systems of all kinds.

There may be a single, off-platform transaction that occurs prior to Check22 service activation for a payer. This step may be a security measure, designed to prevent account hijacking by third parties who might attempt to use the Check22 platform to create instruments against DDA checking accounts which are not theirs.

In such a step, it may be that a single, randomly determined, sub-dollar transaction may be posted to the account for which the payer has provided the routing and account number information. To complete the setup and activate Check22 service, the payer may enter the correct amount of the test transaction into the Check22 setup interface.

Check22 users may have access to an online list of the payees to whom they have made Check22 payments, as well as a register of Check22 instruments they have created.

Users may select existing payees for additional payments at any time through the online web interface. Users may also re-create and re-send a Check22 instrument if it has been lost and needs to be replaced. This functionality leverages the concepts of "Phone Books" and GenieCheck Registers already existing in the underlying Genie platform. Unlike a Genie Check Register, a Check22 Register generally does not track Check22 instruments past their creation, as they have left the Genie Platform after being created and emailed, but it could do so.

As noted above, merchants doing any volume of transactions with multiple Check22 payers may submit a list of upcoming scheduled payments.

Merchants may submit this information in one or more of the following non-limiting ways: Excel spreadsheet, Comma Delimited (CSV) file, Secure FTP upload, and/or programmatically using XML formatted data through a software API.

Notifications to payers by text, email and phone may be made by leveraging the existing communications capabilities of an underlying interactive communications (e.g. Genie) platform or the like.

Follow up notifications to merchants about non-authorized payments are only available when data has been submitted using the XML format and the programmatic interface. Then notifications are made by leveraging the existing email communications capabilities of the underlying Genie platform.

Looking to FIGS. 19-22, in one non-limiting embodiment, there is a cash box module (hereinafter called Genie CashBox) that may integrate one or more of four powerful technologies; Telecommunications, Television, Internet and Electronic Banking, into one seamless global service.

A purpose of the Genie CashBox may be to fundamentally rearrange the existing concepts of financial services and communications—which traditionally involved simple telephone calls, text messages, payments, receipts, checks, debits, etc. being delivered through a single entry point across a single medium to a single destination—to instead allow the communications to be more complex, be submitted through a variety of entry points, and be transmitted across multiple media to multiple destinations. Further, the Genie CashBox may be designed to provide, send and receive this communication and financial information with greater ease and lower costs, allowing for disruptive pricing.

The Genie CashBox adds several new inventions to the fundamental components described in three previously patented inventions: the GenieMessenger, U.S. 61/470,617, filed Apr. 1, 2011, the Interactive Communication System, patents pending, U.S. Ser. No. 13/437,758, filed Apr. 2, 2012 and the Genie UPN, patents pending, U.S. Ser. No. 13/593, 048, filed Aug. 23, 2012, which are incorporated by reference herein in their entireties.

Product Packaging—Summary

The Genie CashBox product exists in three non-limiting configurations:

Genie CashBox Lite—a Consumer product containing the basic elements of the invention Genie CashBox Premium—a Consumer product, containing all the components of the invention.

Genie CashBox Gateway—a Merchant or Agent product, combining all the features of the present invention with all the features of the previously patented Genie Gateway invention.

The following section describes the components and features of one or more embodiment of the invention, including references to elements of the previous inventions where appropriate. Following that will be a further discussion of product packaging, in terms of the specific components included.

Product Components and Features

The Genie CashBox Button

The Genie CashBox Button (See FIG. 19) may be a personalized HTML client icon that may be embedded in a subscriber's email messages, on their website, in electronic documents and brochures, in content on social media sites, or in any location where an HTML document may be displayed. When an interested party clicks on the Genie CashBox Button, they are taken to the Genie CashBox Client associated with the subscriber's Genie Number.

A default Genie CashBox Button may be created simultaneously with the Genie CashBox Client as described below. Subscribers may also create their own custom Genie CashBox Buttons.

The Genie CashBox Client

The Genie CashBox Client may be the primary interface to the features of the Genie CashBox. It may be a unique web-email—Smartphone—webpage/client, created by and for each individual subscriber through an interactive online process. Both the client and its creation process are aimed squarely at businesses and individuals who want a flexible presence in the financial services world without the cost and complexity of the build-it-yourself approach.

Through the Genie CashBox Client, a subscriber may receive, store, manage, verify and remit funds with full integration of a virtual checking account and debit card system.

Additionally, with a single click by a friend, family member or a business associate a Genie CashBox subscriber may receive a telephone message, a text message or an email (or all three) with a short text message to advise them that someone wants to contact them and why.

Subscribers may, at their option, call back, email, text or VOX their party, at their convenience. All aspects of the communication in both directions are handled directly through the single underlying platform.

Overview

Genie CashBox Clients are created online by the subscribers and each Client may be customized with the subscriber's name or business name, their marketing slogan, their Genie Number, and other website (if any). The resulting configuration reflects what each subscriber chooses to share and display.

The following points reflect how these features are explained to Genie CashBox subscribers. This material may be intended to convey to the subscriber how the people to whom they are presenting themselves may use the Genie CashBox communication features provided to both the subscriber and their friends and/or customers. Each of the points below includes a clickable link for additional details.

Genie CashBox Main Features

Genie CashBox subscribers receive the following capabilities and benefits

Stored Value Account, used to receive funds from third parties, maintain balances, directly disburse funds, electronically to other subscriber's on the system, or to third parties using one of the following two mechanisms:

Virtual Check Writer, used to create valid, fully negotiable checks, payable against their funds in the subscriber's Stored Value Account. Checks created using the Virtual Check Writer may be printed and deposited as an ordinary check, negotiated in person at a participating financial institution, sent as email attachments to third parties, printed and mailed to third parties by either the subscriber or by the system, or printed and deposited electronically using any financial institutions "smartphone" or other electronic deposit application.

Integrated Debit Card, allowing the subscriber to withdraw against the funds in their Stored Value Account using any participating Automated Teller device, Point of Sale terminal or online vendor.

The "one-click" way for anyone to reach them!—Their Genie CashBox may be the absolutely UNIQUE web/email tool that links people to them, free of charge, from ANYWHERE in the world! The "one-click" way for any business or individual to be reached with Unified Messaging, Group Messaging, Voice & Emergency Messaging, Private & Social Network Messaging, without giving up their privacy, and more!

Click-to-Connect phone calls free worldwide—Visitors to their Genie CashBox may click on the Genie Number displayed and be connected from their web enabled device.

Send and Receive GenieVOX—GenieVOX (Voice SMS) may be AllCom's unique blending of the power of Voice Messaging with the ease and flexibility of Text Messaging. VOX allows subscribers to send and receive short SPOKEN message with one person or thousands, quickly and easily. When they get a VOX you may do one or more of the following non-limiting actions: Reply with a VOX of their own; Reply with a telephone call; Send the caller ID of the sender to voicemail, and/or Block the sender's caller ID from sending them future messages; Send and Receive emails—Send and receive emails to and from their Genie Number; Send and Receive TEXT messages—Send a text message to Genie Numbers in their SendTEXT PhoneBook; Send and Receive WAV or MP3 files—Send an audio file to the E-Mail addresses and Genie Numbers in their SendWAV phonebook as an attachment; Send and Receive Faxes form any web enabled device—Send and receive any Microsoft Office or Open Office documents from any computer and any web enabled device. When faxes are received may be displayed as a printable PDF document; Send and Receive documents form any web enabled device—Send and receive any Microsoft Office or Open Office documents from any computer and any web enabled device.

Genie CashBox will convert and display all documents regardless as to their original form to a printable PDF document; Dynamic Caller ID Greetings. Genie CashBox captures the caller's ID (when available) from each call to provide subscribers with several one click features, including but not limited to: Block unwanted callers anytime; Accept or not to accept calls from a blocked callers IDs may be always their choice; Record custom greetings, in any language, for any caller ID (for important customers or friends); Automatically send specific callers to voice mail so subscribers may call back at their convenience; Automatic shortcut to hearing their messages when calling from their own phone, cell or landline; Automatic shortcut to using Genie for their outbound calls (save money and keep your privacy) when calling from their own phone; Follow Me—Change their FollowMe numbers and default greeting; Call Me—Program Genie to call subscribers immediately at a specified number (Call Back), reduce hotel phone charges and long distance charges; Genie CashBox—The "One-Click" way to receive messages from anywhere free, create as many FREE Genie CashBoxs as they need with a hyperlink showing their name or business name and Genie Number; SendFILE—Send a file to the E-Mail addresses and Genie Numbers in your SendFILE phonebook as an attachment; GenieMail—View and retrieve their emails, voice mails, faxes, and pages online. Use as regular email. Subscriber's Genie email address may be 9991230000@geniemail.com; Your GenieMail format may be 8001234567·GenieMail.com; and/or Phone Books—Manage all their PhoneBooks.

Financial Transactions

Stored Value Account

The subscriber's funds are maintained in a Stored Value Account. Subscribers may load funds into the Stored Value Account in any of several ways (See FIG. 20):

Cash—The subscriber makes a cash deposit through a participating financial institution. Cash deposits are made using a specially formatted deposit slip, prepared online through the Genie CashBox client.

Check—The subscriber deposits a check through a participating financial institution. As with cash deposits, check deposits are made using a specially formatted deposit slip, prepared online through the Genie CashBox client.

Bill Pay (Peer to Peer)—The subscriber loads value from another Stored Value Account that they control on the system. Alternately, a different subscriber may remit funds to the subscriber as a Peer to Peer transaction. No subscriber may DRAW funds from a Stored Value Account that they do not control.

Mail—The subscriber sends one or more check to AllCom by postal mail. As with cash and check deposits, mail deposits are made using a specially formatted deposit slip, prepared online through the Genie CashBox client. The checks being tendered are also entered online through the Genie CashBox client for verification against the mailing received.

Bank Account—The subscriber may enter the appropriate routing and account information online through the Genie CashBox client to prepare and process an online banking transaction against an account they control at an outside financial institution, such as a bank or credit union.

Credit Card—The subscriber enters information online through the Genie CashBox client, and a debit may be processed against a properly authorized credit card.

PayPal—The subscriber may enter the appropriate information online through the Genie CashBox client to authorize the transfer of funds from a PayPal account they control.

The fact that there may be no ability for anyone to "draw" funds from a Stored Value Account that they do not directly control makes the Genie Stored Value Account inherently safer than traditional DDA's, which are subject to unauthorized withdrawals via means such as ACH. The Micropayment Engine used for managing the stored value accounts may be described in further detail under "Monetary Handling" below.

Integrated Debit Card

The subscriber may optionally request a Debit card, integrated with their Stored Value Account, enabling all standard Debit Card transactions. These transactions may be closed loop, occurring completely on-platform between subscriber's to the service. Or they may be open loop, occurring between the subscriber and any third party that accepts debit card transactions. Debit cards are issued by one or more major card issuers in participation with AllCom.

Virtual Check Writer

The Virtual Check Writer integrates with the subscriber's Stored Value Account to allow the creating of valid, fully negotiable checks, drawn against the subscriber's stored funds. Checks created with the Virtual Check Writer are drawn against one of several possible major financial institutions, in participation with AllCom. Management of the virtual checks between institutions may be a major component of the invention. The fund remittance features are described in greater detail under "Financial Services" below.

Messaging

Message Content

The message content of material submitted through a Genie CashBox may be identical to that submitted through the Genie Messaging Gateway.

Message Submission

The message submission process of material submitted through Genie CashBox may be identical to that of material submitted through the Genie Messaging Gateway.

Message Delivery

The message delivery process of material submitted through an Genie CashBox may be identical to that of material submitted through the Genie Messaging Gateway.

Simultaneity

Messages submitted through the Genie CashBox have the same properties of simultaneity as those submitted through the Genie Messaging Gateway.

Confirmation

Messages submitted through the Genie CashBox receive the same confirmation handling as those submitted through the Genie Messaging Gateway.

Message Response

Subscribers may respond to messages submitted through the Genie CashBox in all the same manners as those submitted through the Genie Messaging Gateway.

Communication—Inbound Features

In addition to the presentation capabilities described above, the Genie CashBox also provides web visitors with a number of options for sending information to or otherwise communicating with the subscriber.

Connect with Phone Call—

A web visitor may initiate a voice call with the subscriber. The web visitor will be presented with two options:

Call Back—The visitor will enter a telephone number and other identifying information. The system will initiate a telephone call to the visitor at the indicated phone number, and immediately connect that phone call to the Universal Office (described below) belonging to the subscriber. The visiting caller may be then able to use the features of the Universal Office to connect to the subscriber, leave a message, etc.

Web Call—If the web visitor may be accessing the Genie CashBox from an audio-enabled web device (such as a computer with headset or speakers and microphone, tablet device or a smartphone), the visitor's web session may be connected directly to the subscriber's Universal Office, using Voice Over IP communication. Name, telephone number and other identifying information may be still gathered for record-keeping purposes.

Access Conference Call

The web visitor may request a connection from his or her audio-enabled web device (such as a computer with headset or speakers and microphone, tablet device or a smartphone) directly to the Conference feature of the subscriber's Universal Office. The web visitor may then participate in an audio conference with the subscriber and others, without regard to whether the other participants are using any mixture of telephones, web devices or any other future supported technologies.

Send a GenieVOX

The web visitor may select to send a GenieVOX (described in more detail below). The visitor will be presented with two options: 1) Call Back—As described above, the visitor will enter phone and other information, receive a telephone call from the system, and be allowed to record a GenieVOX message, to which the subscriber may respond by one or more of the following non-limiting options: Return VOX; Return Phone Call; Pass to Voice Mail; Block future VOX's from the caller; and 2) Web Call—As described above, if the web visitor may be accessing the Genie CashBox from an audio-enabled web device the visitor's web session may be allowed to record a GenieVOX message, to which the subscriber may respond by one or more of the following non-limiting options: Return VOX; Return Web Call; and/or Pass to Voice Mail. Name, telephone number and other identifying information may be still gathered for record-keeping purposes.

Send Email

The web visitor may enter name, email address, other identifying information and a brief email message, which will be sent to the subscriber's email account. It may be important to note that the subscriber's actual email address may be not exposed to the web visitor or to web information harvesting tools.

Send Text Message

The web visitor may enter name, email address, other identifying information and a brief text message, which will be sent to the subscriber's cellular telephone and/or email account, at the subscriber's option. It may be important to note that neither the subscriber's actual cellular phone number or email address may be exposed to the web visitor or to web information harvesting tools.

Send Recording

The web visitor may upload a short audio recording in a WAV or MP3 format. if the web visitor may be accessing the Genie CashBox from an audio-enabled web device the visitor may also optionally record a message directly through the web interface. The resulting uploaded or recorded message will be delivered to the subscriber either in an attachment to an email message, or as a voice mail recording, at the subscriber's option. As with all such features, the subscriber's actual email address and/or phone information may be never exposed.

Send FAX

The web visitor may upload a document in numerous formats including but not limited to Microsoft Office documents (Word, Excel, etc.), equivalent Open Office documents, or images such as JPG, GIF, TIFF, PDF, etc.

The system will convert the uploaded document into PDF format and deliver the resultant PDF to the subscriber as an email attachment, an/or send the output to a FAX machine designated by the subscriber. It may be important to note that neither the subscriber's actual FAX phone number or email address may be exposed to the web visitor or to web information harvesting tools.

Send Document

The web visitor may upload any combination of 5 document in numerous formats including but not limited to Microsoft Office documents (Word, Excel, etc.), equivalent Open Office documents, or images such as JPG, GIF, TIFF, PDF, etc. The system will convert the uploaded document into PDF format and deliver the resultant PDF to the subscriber as an email attachment. As always the subscriber's actual email address may be never exposed to the web visitor or to web information harvesting tools.

Genie to Genie Transfer

The web visitor may enter information to remit funds from their own Genie account to the subscriber for any of a variety of purposes. Anticipated uses include merchandise sales, charitable donations, political contributions, etc. The fund remittance features are described in greater detail under "Financial Services" below.

Product Packaging—Detailed Table

As outlined above, the Genie CashBox product exists in three configurations, to serve several different subscriber bases. The table in FIG. 21 details non-limiting exemplary embodiments of product packaging for a Genie CashBox system, in terms of the specific components included.

Methodologies

The Genie CashBox Client may be a unique web interface, that may be generated and hosted specifically for each subscriber, to link anyone in the online world with One-Click to subscribers and to their individual audio and/or visual information. The Genie CashBox may be an extension of the Genie Messaging interface.

Overview

The Genie CashBox product may be a unified system for receiving, managing and disbursing funds, as well as exchanging short messages from business-to-business, business-to-consumer or consumer-to-consumer, across several communications media simultaneously.

Financial Services Methods

Funds Transfers

Each Genie CashBox account may include, if the subscriber chooses, an instrument called the GenieCard. The GenieCard may be a stored-value, reloadable debit card, carrying a major debit card issuer logo, and serviced through the same banking channels as all other major debit cards.

- Transfer Interface—Generally all financial transfers are initiated using the web interface. The appropriate interface may be ONLY available through the use of the Genie CashBox (described above under Message Submission).
- Transfer Target—Generally all financial transfers made through the Genie CashBox system are made to the GenieCard of the receiving subscriber.
- Transfer Sources—The third party using the Genie CashBox system to send money to a subscriber may choose among four sources from which to submit the funds:
- Credit Card—The sender may charge the desired amount to a credit card. Accepted cards include Visa, MasterCard, American Express, Discover and Diners Club. Credit Card transactions are confirmed immediately with the source issuer, and are credited to the recipient's GenieCard after 72 hours.
- GenieCard—If the sender may be also a subscriber to the GenieCard system (which may be as a Genie CashBox subscriber, or as a subscriber to several other of AllCom's product packages), they may transfer the money from their own GenieCard to that of the recipient. GenieCard to GenieCard transfers are processed in real time, with the funds being immediately withdrawn from the source account and made available in the recipient account.
- eCheck—The sender may elect to have the funds withdrawn electronically from a checking account. In this case, the sender will need to provide the routing and account information from their checking account. eChecks are processed through the Automated Clearing House (ACH) system, and require two business days to complete and be credited to the recipient account.
- Cash Deposit—Finally, the sender may wish to provide cash as the method of payment. In this case, the sender will be asked to select from a list of financial institutions that are partnered with AllCom. The system will then prepare a unique deposit slip for the transaction, including all the routing information required to transfer the funds to the GenieCard account of the intended recipient. The sender then takes the deposit slip and cash funds to the selected financial institution as a regular deposit transaction. Cash deposits are processed to the recipient GenieCard account two business days after receipt. This method may not be used with any medium other than cash. No credit card, check, money order or other instrument will be accepted.
- Funds Use—Funds thus received are available to the subscriber in the time frame as indicated above. Funds may be accessed as a cash withdrawal at any Debit-capable ATM worldwide, by making a debit purchase at the location or web site of any merchant accepting Major-logo debit cards.
- Transfer Notification—The sender receives an email notification of the transfer, just as they may receive notification of a text message. The recipient receives similar notification of the transfer by email and text message.

The "Send Payment" Web Interface

A "Send Payment" screen (See FIG. 22) may be used to send funds directly from the Genie CashBox subscriber to another subscriber of the Genie systems.

The "Check Writer" Web Interface

The Virtual Check Writer (See FIG. 23) may be used to create check which may be printed, emailed or deposited electronically. The subscriber may use these check to withdraw funds from their Stored Value Account to use themselves, or as a payment means to any third party. The subscriber simply enters the identifying information for the intended Payee, along with the dollar amount (which may be entered in an amount that may exceed the available funds on account), and an optional memo.

Figure 24:
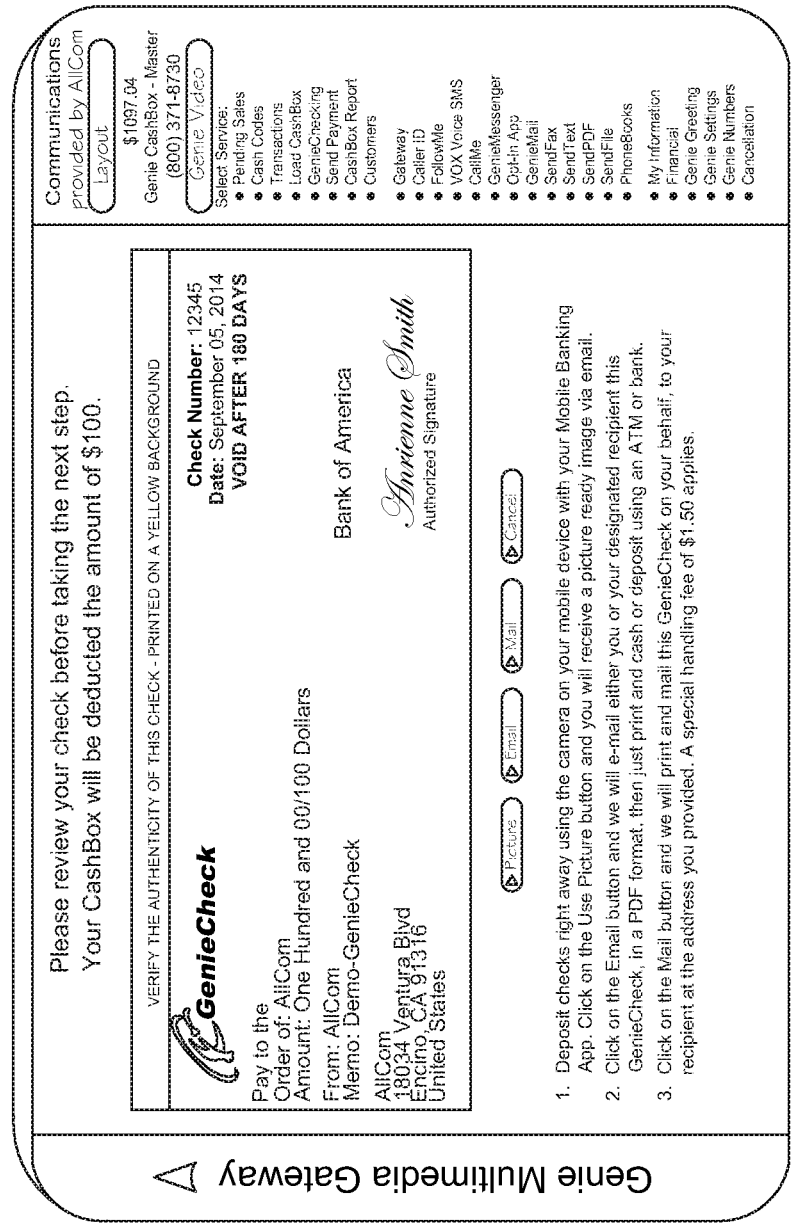

The system then produces a representation of the check to be printed (See FIG. 24). The subscriber may then choose whether to: Email the check—a printable PDF of the check will be emailed to whatever address the subscriber enters; Email a Picture—a printable PDF of the check will be emailed to whatever address the subscriber enters. The PDF will include additional information suitable for electronic deposit by smart-phone or any other bank-supplied online application the depositor wishes to use; and/or Mail a Check—The check will be printed by AllCom and sent by traditional postal mail to the payee at the address inscribed on the check.

Banking Integration

Upon production of the check (by email, "picture" or traditional mail), the participating financial institution on which the check may be drawn may be notified electronically of the check. This electronic notification includes one or more of: Name of the drawing subscriber; Name of the inscribed Payee; and/or Dollar amount of the check.

Upon presentation of the check by any of the various deposit methods, the banking institution may be able to verify the details of the check against its electronic notification, record the check as having been presented, take the appropriate payment actions (disburse cash, credit a demand account, etc.) and close the transaction.

The use of the electronic verification methodology in the invention precludes all anticipated fraudulent uses, including but not limited to: alteration to the check prior to presentation, presentation by unintended parties and multiple presentation of the same instrument through parallel channels.

Messaging and Communications Methods

Message Content

The messages handled by the Genie CashBox service generally contain one or more of the following non-limiting elements: Genie Number[1]—The unique telephone number assigned to the subscriber for whom the message may be intended; Sender's Call-Back Number—The phone number at which the message sender may be reached; Sender's Name—The sender's name in text or as a recording (see Message Submission—Telephone, below); Sender's Email Address—The email address at which the message sender may be reached; Brief Text Message—A short text message of 140 characters or fewer; and/or Urgency Flag—a Yes/No selection as to whether the message may be urgent.

[1] See below for a more detailed explanation of the Genie Number invention.

Message Submission

A consumer submits a message to the Genie CashBox service through any of three paths. The only information the message sender needs may be the Genie Number of the subscribing customer to whom the message may be directed. (See 'Genie CashBox' for an exception)

Telephone—The message sender may directly call the Genie Number for the recipient. From a spoken menu of options, they may select the option to Page the subscriber. When submitting a page by telephone, the sender may be asked to record their name (rather than enter it as text), and may be also allowed to mark a paging message as urgent. No email or text message information may be gathered.

Web Site—The message sender may use an Internet web browser to go to the website www.GenieMessanger.com. There, they enter all six of the key message elements listed in Message Content, above. They then select the Send Message option to submit the message.

Genie CashBox—Service subscribers have an option to create a personalized icon, called the Genie CashBox, which encapsulates their own Genie Number and their name into a graphic element which they may then add to their email messages, websites, etc. A message sender may then click on this personalized icon to start the message submission process. They are taken to the same basic web interface described above, except that the Genie Number of the intended recipient may be pre-populated. Thus, the sender does not need to know either the Genie Number of the recipient, nor the web address of the submission site.

Message Delivery

The submitted message may be delivered to any or all of the following targets. Which target or targets receive the message may be at the discretion of the service subscriber, and may be reconfigured at any time.

Pager—If the subscriber has registered a traditional pager, they receive the sender's callback number through that device.

Email—If the subscriber has registered an email address with their service, they receive an email with the details of the page. In the case of a telephone submission, the message includes the date/time, the callback number entered and a copy of the recorded caller name. In the case of a Web or Genie CashBox submission, the message includes the date/time, and all six of the Message Content items listed above.

Voice Notification—If the subscriber has registered a notification number (from 1 to 3 numbers may be registered), they receive a phone call alerting them to the callback request. The phone message contains the date/time of the message and the callback number. In the case of a telephone submission, it also includes the recorded name of the sender.

Cellular SMS Message—If the subscriber has registered an SMS capable cellular number, they receive a text message on that device. In the case of a Web or Genie CashBox submission, the message contains the date/time, and all six of the Message Content items listed above. No SMS Message may be currently generated by a Telephone submission.

Web Interface—At any time, the subscriber may log in to a separate web interface provided as part of their subscription, and retrieve Genie CashBox messages in the form of a web-based version of the E-Mail notification described above.

Simultaneity

Genie CashBox messages are delivered to the subscriber through all of the relevant pathways at the same time. Which method or methods will be used may be at the sole discretion of the subscriber, based entirely on which pathways they have registered in their service setup. These options may be changed by the subscriber at any time, to suit their individual needs.

Confirmation

In the case of a Web or Genie CashBox submission, the sender receives an email message confirming their submission, including the date/time of the submission, and all six of the Message Content items listed above. The confirmation message does NOT include information on which delivery path or paths were used to deliver the message to the subscriber. (See the sample Confirmation Receipt of FIG. 25)

Message Response

The subscriber may respond to the message immediately, in any of several means, depending on the path through which they receive the message.

Pager—The subscriber may return the call through any ordinary telephone of their choosing, or by calling in to their service number.

Email—The subscriber may respond to the sender's email address embedded in the message, or note and use the telephone number as with a traditional pager message.

Voice Notification—The subscriber may press a single key on their telephone keypad to place a return call to the caller's number.

Cellular SMS Message—The subscriber may use the SMS features of their cell phone to reply to the embedded email address of the sender, or to reply to the embedded phone number of the sender.

Web Interface—As with a direct email message, the subscriber may respond to the sender's email address embedded in the message, or note and use the telephone number as with a traditional pager message.

Key Concepts

Some Key Concepts behind the Genie CashBox service are as follows:

Ease of Use—The sender needs only a minimal amount of information to be able to reach the subscriber.

Flexibility—The subscriber may at any time alter or adjust the methods of delivery to suit their needs, without having to notify potential senders of any background changes, such as changed phone numbers, travel and availability Redundancy—The sender and subscriber may both be assured that multiple delivery paths will be used whenever available, thus reducing or eliminating the likelihood of delivery failure and missed messages.

Privacy—The subscriber does not need to disclose private details to the sender, such as personal cell phone or pager numbers, email address, etc.

Traceability—Both the sender and the subscriber receive sufficient information to determine the actual date, time, and content of the message, thus reducing or eliminating the possibility of misunderstandings as to the course of the message exchange.

Responsiveness—The subscriber may be able to respond in any of several ways, at their complete discretion.

Summary

By combining multiple methods of submission and delivery into a single system, Genie CashBox provides a uniquely complete system for receiving, managing and disbursing funds, as well as delivering and responding to short messages traditionally handled by much more limited paging and notification systems. With this combination of features on a single platform, Genie CashBox provides capacity not offered by any competing product. The unique self-service approach of creating a Genie CashBox may be an integral part of the invention. The intent may be to enable subscribers to create and activate their Genie CashBox on their own, anytime by simply typing their name, and a few other details. The key may be simplicity, full automation, and self-service.

The Genie CashBox may be about managing funds and communications with privacy, security, safety and economy. Individuals who are tired of living in a glass house where their personal information such as their home phone, work phone, cell phone, email address, telephone call records, emails, or search habits are subject to intrusive data mining for profit, by parties with ulterior motives—from using this information for advertising the goods and services of third parties to identity theft and other frauds—may utilize the Genie CashBox as their personal CashBox and buffer.

Genie CashBox Clients generally do not contain any of a subscriber's confidential information. Thus they are safe to distribute via email, electronic brochures, or displayed on websites and smart cell phones as an application. The personal information of the subscribers may be stored on the password protected secure Universal Office Softswitch ("Softswitch") so that the personal financial records, accounts and institutional relationships, private telephone numbers, geographical locations or the email addresses of the subscribers are not revealed unless the subscriber wishes to do so.

The following are non-limiting features, functions, benefits, operations, steps, and structures associated with interactive communications systems and methods which may be incorporated into one or more embodiments of the invention:

Virtual Telephone Numbers—Genie Number

The Genie Number may be a unique "digital identity" for subscriber's to use as a passport to personal privacy and security in a world where, telecommunications, the Internet, and electronic banking are seamlessly integrated into one unique number the International Genie Number. Genie Numbers are the CashBox to the Genie Cloud used by Subscribers and their callers to communicate and send and receive calls, messages and transaction from each other. In addition to the International Genie Number AllCom also provides its Subscribers with a Local Genie Number and a Toll-Free Genie Number. AllCom offers Subscribers three types of Genie Numbers: Local Genie Numbers, Toll-Free Genie Numbers, and/or International Genie Numbers.

Genie Numbers are virtual telephone numbers, hosted on the Softswitch, and do not reflect any information about the Subscriber's personal telephone numbers, telephone calls, or their geography. Subscribers may utilize AllCom's FollowMe service to receive their telephone calls, messages, faxes and paging anywhere, anytime on any telephone, without revealing their private information unless they choose to.

When returning calls through the Softswitch the caller ID shown to the call recipient may be configured (regardless what telephone may be used to return the call) to display: the subscriber's Genie Number; a general system number for those subscribers who desire more privacy; or any telephone number selected by the subscriber. AllCom developed the software which enables it to host, manage and activate of both toll-free and local telephone numbers from telephone companies providing service in thousands of cities around the world. Genie subscribers may establish local presence in any market where Genie Numbers are available, without needing their own physically local office and without long distance or international telephone charges.

A subscriber in San Francisco may easily activate a local Genie Number in Chicago, New York, London or Paris, which ring in their office, home or on their cell phone in San Francisco without long distance or international charges and without the need to order that service from the telephone companies in the originating cities. Genie Numbers may be used to: Receive telephone calls; Make telephone calls; Receive messages; Send and receive emails; Receive faxes; Receive pages; Host conferences; Process merchant transactions; and/or Send and receive money.

Numbered Email Addresses—GenieMail

GenieMail may be an all in one communication center which for privacy reasons utilizes a numbered account concept (subscriber's Genie Number) in lieu of their name in the email address.

GenieMail may be a web-based, hosted email service tightly integrated with voicemail, SMS messaging, FaxMail and TelePaging. GenieMail enables subscribers to send, view and retrieve their emails, manage their voicemail, faxes, and pages online from any internet enabled computer.

In keeping with the self-service business model, GenieMail accounts may be created by subscribers online, free of charge, anytime. AllCom's business model does not include selling advertising or information to third parties and thus has no built in conflict-of-interest which may lead to data mining emails and the habits of its subscribers.

The unique invention in GenieMail may be the Unified Inbox which integrates and synchronizes with AllCom's voicemail, FaxMail, paging and messaging services. When logging in, subscribers will use GenieMail's Unified Inbox to navigate through all their messaging needs. Please see below:

You have:
11 Unheard Voicemails messages
4 Unseen Faxes
0 Unseen Pages
9 Unread Emails
Check Messages Online Genie subscribers may utilize their Genie Number as their email address (for example 8004567890@GenieMail.com) or select an alias (for example GenieSubscriber@GenieMail.com). Aliases may be created through the Alias Manager and are aliases to the primary email address, which always utilizes the Genie Number.

GenieMail supports both the POP3 and IMAP protocols. The difference may be POP3 messages are downloaded directly to, and managed on the subscriber's local computer. IMAP keeps all messages on the Softswitch and allows subscribers to manage them there. Therefore an IMAP client will mimic the folder structure displayed on the GenieMail website, and look the same on all computers used.

Genie SMS

Genie SMS may be an application invented to enable AllCom to send emails that simulate text messages. The public may be familiar with sending text messages from cell phone to cell phone as well as sending emails from various web enabled devices. Sending emails may be almost always free as they are sent via the internet while sending text messages may be not free as they are sent on the telephone network.

The public does not commonly know how to send emails to cellular telephone numbers because each cellular provider has a different protocol to receive emails and their customers do not know these protocols. Cellular providers do not usually publish this information as they prefer text message usage thus generating revenues instead of the free email service.

AllCom's invention may be the combination of a database of all the protocols of cellular companies worldwide with a user interface in which subscribers only need to select a country, enter the cellular number, and select the cellular provider for that number. AllCom's Softswitch then matches their message with the appropriate cellular provider's protocol and sends an email in a text message format.

This program enables users to enter messages of up to 140 characters, on any internet connected device with a keyboard, then packages that message in a text message format but delivers it as an email to the selected cellular provider. The end result may be that the recipient receives a message that looks like a text message but may be charged for receiving an email—usually a lower priced or non-charged event.

Genie-to-Genie Text—VOX Messaging Applications

Genie-to-Genie text messaging utilizes the Genie SMS invention but may be designed to utilize a Genie CashBox Application, downloadable to all smart phones, tablets, personal computers and other internet connected devices.

This system will uniquely contain the specific requirements of each device hosting such Applications and will communicate over the internet directly with the Universal Office Platform where all the required protocols and the private user information will be maintained.

Each Application will be branded with a unique Genie Number embedded as the "send and receive identification number" instead of the commonly used cell phone numbers of the sending or the receiving device.

Genie-to-Genie Text Messaging will not use the sender's private cell or land line phone numbers or an email address to identify the sending or the receiving device and all such private information will be maintained under the direct control of each Genie Subscriber in their password protected account on the Universal Office Platform.

The Applications will provide senders with the ability to send either a text message or a VOX—Voice SMS to a single Genie Number or select one or all the Genie Numbers contained in their SendTEXT PhoneBook with a single command Genie Subscribers will be able to send a text message from any internet enabled device with a keyboard. The "Sender's Address" will always be their Name and Genie Number regardless of which device they use to send their message.

The Applications hosted on the receiving subscriber device will display the text, as well as store it locally on the receiving device, and play the audio VOX SMS allowing the receiving Subscriber to simply reply with one click.

To insure that text messages and/or audio VOX SMS messages are not lost due to cellular devices, international calls, either because of hardware or connectivity Genie will always send a duplicate message as an email to the receiving subscriber. That way, no matter what they may always read and/or listen to their messages on their personal computers and create folders containing important messages on devices that have sufficient storage capacity.

GenieVOX—Voice SMS

GenieVOX—Voice SMS may be AllCom's unique blending of the power of Voice Messaging with the ease and flexibility of Text Messaging. VOX allows a subscriber to send and receive short SPOKEN message with one person or thousands, quickly and easily. With traditional "voice mail", one calls someone, gets their "answering system" instead, leaves a message and waits for someone to call back.

AllCom's Genie VOX Messaging reverses that process model. With a VOX message, a subscriber records a short message (up to 3 minutes) locally on their smart phone or personal computer FIRST, and then sets it for delivery—to one person, or to hundreds—even thousands.

VOX may be used to send meeting announcements to the members of a subscriber's club, product updates to a sales team, weekly special deals to the customers of a business, etc. The related Genie "Opt-In PhoneBook" insures that the subscriber's messages are going to people who actually WANT to hear from them. The delivery of VOX messages may also be immediate or scheduled for an appropriate time in the future.

But VOX may be more than simply a message delivery system. A VOX message may be the beginning of a conversation or dialogue, just as an ordinary text message may. The people who receive a VOX messages may reply with messages of their own. The AllCom Softswitch will also give message recipients the opportunity to call the sender right back, if the sender so chooses. This functionality also works for replies.

VOX allows subscribers to complete their calls when they ordinarily may't. When making a telephone call, if a "ring no answer" or a "busy" may be reached subscribers may record a message and ask Genie to deliver it later. Genie attempts to deliver all VOX Messages at least three times, once every sixty minutes.

When a VOX may be delivered, Genie gives the receiving party the opportunity to: (1) listen to the message and hang up; (2) press 1, and record a response which may be delivered and stored as a voicemail message; (3) press 2, and be connected to the sender of the VOX. An "Open VOX" message may be sent to a specific telephone number, and will deliver the message the moment that specific telephone line may be answered, regardless of who answers the call.

After the recorded message may be delivered, if the call may be answered by a human they will be prompted with the option to reply with a message of their own or be connected to the Genie Number of the originating sender.

"Private VOX" messages are intended for a specific individual. Genie will call and announce that there may be a VOX for a specific individual and ask that individual to press 1 to confirm that they are the intended party or press 4 if the party to whom the VOX may be intended may be not available. If the party may be unavailable, Genie will call back later to attempt delivery. Private VOX Messages will only be delivered if someone presses 1 as a response to the prompt. Genie will not deliver the VOX to Answering machines voicemail or other automated responses. After the recorded message may be delivered the receiving party will be prompted with the option to reply with a message of their own or be connected to the Genie Number of the originating sender. Private VOX Messages require the sender to record the name of the receiving party or create a PhoneBook containing both telephone numbers and recorded names for future use. PhoneBooks may also contain extension numbers, which Genie will either request verbally, or enter as touch-tones when delivering the VOX.

The recorded entries in the PhoneBook may also have been created using the Caller Voice Capture feature described above. In that case, when the subscriber sends a VOX to that person, Genie will announce the recipient's name in that party's own voice, clearly indicating that the VOX may be actually private.

TelePaging

TelePaging may be a unique service that lets callers page Genie subscribers even if they don't have a pager or a cell phone. The procedure for TelePaging a subscriber may be identical to the regular paging program. The only difference may be that instead of receiving the page Genie calls the subscriber on their telephone and delivers the information as a recorded message.

TelePaging may search up to three telephone numbers, for example, office, home or cell phone. The immediate benefit may be that customers no longer need the additional cost or inconvenience of carrying a cell phone or a pager. And when a notification may be received, subscribers may simply press the star key and connect to the paging party. With TelePaging, subscribers may also add their own comments to the message and forward the Page to any other subscriber (such as another member of their business organization) for follow-up.

In addition to the above telephone notifications TelePaging will also capture the caller's name and telephone number and send that information in an email with a way attachment containing the name of the caller.

When someone wants to reach a subscriber, they may just call their toll free Genie Number, say their name and enter their phone number. Genie will call the subscriber at the number the subscriber provided, plus send a text message and email with the information left by the paging party.

Universal Office Softswitch

The AllCom Universal Office Platform (UO) may be a proprietary Softswitch which integrates three powerful technologies into one seamless global service on the same platform. Telecommunications, the world's most universal and interactive communication medium; Electronic Banking, the key to electronic commerce; and the Internet, the world's most powerful information medium.

This elegant solution may be proprietary and enables AllCom to deliver telecommunications, internet based services and electronic banking from one source on the same platform. By moving from process to process on the same platform, rather than from system to system—or even company to company—the UO provides faster, more tightly integrated services at a lower cost than any of its multi-platform competitors.

With this combination of integration and flexibility, AllCom may be able to easily deliver highly customized services to various niche markets on the UO, simply by turning certain individual features or feature groups on or off, without re-inventing the process.

In each of the several sections below, we will look at the features and capabilities of the UO in greater detail. When reading each section, it may be important to bear in mind that these are NOT separate systems, but rather different perspectives on a single, highly integrated platform.

Genie Cloud

GenieNet may be the private network connecting all Genie Subscribers with secure protocol into a single cloud in which everything may be "On-Net". Genie accounts may communicate, send and receive messages, faxes, pages, to each other, and send and receive payments, in real time, without the traditional costs associated with off-net transaction. Within the GenieNet there are no long distance charges, transaction fees or the usual Off-Net third party provider fees.

Country Code 999—The Genie Cloud

Country 999 may be an umbrella country code for virtual telephone numbers (International Genie Numbers) in the Genie Cloud, invented to connect Genie Numbers with traditional telephones globally where VOIP phones, cell phones and land-line based traditional phones, television and computer-hosted soft phones may communicate with each other with no long distance or international telephone charges. International Genie Numbers consisting of 10 digits, for example 999-123-4567, will be offered in countries worldwide, under one umbrella, country code 999, followed by seven random digits. For more detail please see Genie Numbers.

Public Access Network

To enable callers using traditional telephones, whether cell or land line, the GenieNet provides a network of Public Access Numbers around the world, directly connected to the GenieNet. These numbers are currently in about 5,000 cities and communities, where callers may call a local number, through their local telephone network and be directly connected to the GenieNet. This connection allows them to directly connect to any of the virtual telephone numbers worldwide that exist only on the GenieNet.

Creating a Genie CashBox—Client (Unified Activation)

Clients are created by subscribers online, in a few minutes, by accessing the Genie CashBox website. To avoid the cost and time of a manual process the "Unified Activation Program" was invented. The Unified Activation Program assigns and activates a local or toll-free telephone number in real-time, integrates the proprietary protocol of the subscriber's cellular provider for receiving text and email, archives the subscriber's name, email address and the telephone numbers where they wish to receive their VOX and notifications, combined with a "Stored Value Account" and a real-time micro-payment engine.

With Unified Activation the creation of a new Client and an account on the Softswitch for a new subscriber was effectively outsourced to the subscriber instead of a call center. The following information may be processed with all new activations:

Select the country in which the subscriber resides. This step will enable the Softswitch to display the cellular providers in that country so that the appropriate cellular provider may be selected by the subscriber. The Softswitch contains a library of the appropriate protocols for text and email to these providers and the proper protocol may be attached to the new subscribers account.

Select the level of service desired by the subscriber. Subscribers may select from free, trial, or paid services.

Enter their name. Because the name may be used when creating the Genie CashBox Client and other electronic brochures the Softswitch automatically spell checks and capitalize the first character in the subscriber's first and last name. Names entered as all caps or all lower case are automatically corrected.

Enter their address. To maintain a higher quality for the database we've developed a program which compares in real-time the information entered by the new subscribers with the US Post Office records to verify that a "real and valid address" with correct zip codes and spelling was actually entered. If a bogus address may be entered the subscriber may be not able to establish an account and get their Genie CashBox.

Establish and setup an acceptable payment method to fund the stored value micro payment account (usually an electronic credit card/debit card payment). This invention includes the complete integration of one or more of the following non-limiting features: An on-net stored value account; A real-time monitoring and processing of the billing & micro payments generated by subscribers; A flexible floor limit which automatically recharges the stored value balance when it dips below the selected floor limit; A flexible recharge limit which enables subscribers to select the automatic dollars amount to maintain their stored value balance; A velocity test monitoring charges based on the frequency and amounts on a daily, weekly and monthly basis for early detection of risk and/or fraud; and/or An internal negative file containing information of subscribers with previous problem records (This negative file uniquely matches payment methods with ANI, IP, SIC and the geography of the subscriber); Activate a unique toll-free and when applicable a local telephone number (Genie Number) for the subscriber; Create and automatically email the subscriber their unique Genie CashBox with instructions how to duplicate and use their Genie CashBox for their emails and electronic brochures; Create and automatically send via email a unique snippet of code which subscribers may use to add their Genie CashBox to their websites; Create a unique Real Time Response System CashBox page on our web servers, linked to the subscribers Genie Number account; and/or Create and automatically send via email a unique snippet of code which the subscriber may use to place a Real Time Response System Banner on the web pages and in their emails.

Monetary Handling

Micro Payment Engine

The monetization of Genie CashBox services results in sub-dollar and often in penny increment transactions. Traditional billing systems are not financially logical for such small transactions. A billing event may be as little as $0.04 and traditional processing costs exceed that amount so AllCom was compelled to invent a real-time micro payment system to address small payments and risk management. For example if a long distance telephone call may be placed by the subscriber then the calling party will be charged for each minute during the call with the final charge after they disconnect. This invention provided for an economic way to charge millions of micro payment transaction fees in real time in a profitable manner Here may be how it works:

Subscribers choose a floor limit which may be monitored to maintain a minimum balance of funds in their Genie Balance Account. Micro payments are presented in real time and are debited from the Genie Balance. No third party financial institutions or processors are involved as all these transactions are processed "in the GenieNet" and thus no traditional third party interchange fees are incurred. Once the balance drops below the floor limit the Micro Payment Engine automatically recharges the account by processing a charge event for a predetermined amount against a previously established external credit or debit card.

TransNet Stored Value Engine

There are millions of people who fall into the "unbanked" category where they don't have checking accounts or credit cards. In today's economy there are also millions of people who prefer to pay by cash. Unfortunately these people are thus often locked out from functioning in today's mostly electronic economy. Many people resort to using prepaid (stored value) debit cards offered by several providers. AllCom's type (business method) of stored value accounts integrate all of the above, the traditional "off-net" method and AllCom's GenieNet method, enabling stored value account holders to use their accounts in the traditional way plus participate in a community where they may send and receive payments to and from all other subscribers in real time, free of any charges from third party providers. This may be a perfect example where telephone, money and the internet are integrated into one seamless service on the Universal Office platform.

In addition, AllCom has integrated a "brick and mortar" element to its Stored Value program by inventing "Deposit Service.com" enabling subscribers to login to their accounts online, select from a list of participating banks, print a special deposit slip which contains their stored value account information, and therewith deposit a cash payment which will be credited to their stored value account.

The Genie CashBox may be an interactive multipoint hub, combining a suite of digital solutions, fully integrating the features of one or more of the following non-limiting systems: Telephone; Voice mail; Calling Card; Fax; Email (GenieMail); SMS (Genie TXT); Voice Messaging (VOX); eWallet to send and receive real-time peer to peer payments (CashBox); Virtual checking account (GenieCheck/Check22); and/or Both a closed loop and an open loop debit card (Genie CashBox Debit Card).

Through specific and selectable combinations of these features, the Genie CashBox may be tailored to suit the needs of three distinct communities of users: Merchants—Businesses and individuals engaged in the selling of goods and services; Agents—Sellers of communications and financial processing services to Merchants; and/or Consumers—purchasing of products.

This elegant solution may deliver all of these services from a single source on a single platform in a single cloud. The unique approach in this invention may be that information moves from process to process on the same platform, rather than from system to system—or even from provider to provider. This approach delivers faster, more tightly integrated services with security, privacy, and safety, at a lower cost than any multi-platform competitors.

The Genie CashBox may be a unique e-wallet which uses a phone number (UPN) as the account number, and enables users to store value and maintain a balance; send and receive peer-to-peer payments in real-time; create GenieChecks online which may be used to withdraw funds by cashing or depositing them in any bank account; email GenieChecks to other recipients anywhere; and/or integrate with a Genie CashBox debit card enabling user to access their Genie CashBox funds through ATMs and anywhere the subject debit card is accepted.

The Genie CashBox may be a robust e-wallet with debit card and checking features which operates as one unified solution. The invention revolves around the single-platform integration of the features listed above, particularly the new GenieCheck, and the special loading and use one or more of the following non-limiting features: cash; checks; bill pay;

and/or retail and online establishments. The Genie CashBox may be designed to be accessed from any of one or more of the following non-limiting devices: internet enabled device; touch tone telephone; Automated Teller Machine; brick and mortar establishments; online merchant; and/or cable TV.

Finally, the Genie CashBox may be designed to fundamentally alter the merchant/consumer relationship as it exists today, by moving purchase and other financial transactions from a "pull" model, wherein a consumer gives a merchant detailed information allowing the merchant to draw money from a consumer's accounts, to a "push" model, where the consumer provides no such information to the merchant, but instead actively sends funds directly to the merchant.

According to one embodiment of the invention, there is a Genie CashBox that may integrate four powerful technologies; Telecommunications, Television, Internet and Electronic Banking, into one seamless global service.

The purpose of the Genie CashBox may be to fundamentally rearrange the existing concepts of financial services and communications—which traditionally involved simple telephone calls, text messages, payments, receipts, checks, debits, etc. being delivered through a single entry point across a single medium to a single destination—to instead allow the communications to be more complex, be submitted through a variety of entry points, and be transmitted across multiple media to multiple destinations. Further, the Genie CashBox may be designed to provide, send and receive this communication and financial information with greater ease and lower costs, allowing for disruptive pricing.

The Genie CashBox adds several new inventions to the fundamental components described in three previously patented inventions: the GenieMessenger, the Interactive Communication System, and the Genie UPN.

The following section describes the components and features of the new invention, including references to elements of the previous inventions where appropriate. Following that may be a further discussion of product packaging, in terms of the specific components included. According to one embodiment of the invention, there is a Genie CashBox Button that may be a personalized HTML client icon that may be embedded in a subscriber's email messages, on their website, in electronic documents and brochures, in content on social media sites, or in any location where an HTML document may be displayed. When an interested party clicks on the Genie CashBox Button, they are taken to the Genie CashBox Client associated with the subscriber's Genie Number.

According to one embodiment of the invention, there is a Genie CashBox Client that may be the primary interface to the features of the Genie CashBox. It may be a unique web-email—Smartphone—webpage/client, created by and for each individual subscriber through an interactive online process. Both the client and its creation process are aimed squarely at businesses and individuals who want a flexible presence in the financial services world without the cost and complexity of the build-it-yourself approach. Through the Genie CashBox Client, a subscriber may receive, store, manage, verify and remit funds with full integration of a virtual checking account and debit card system. Additionally, with a single click by a friend, family member or a business associate a Genie CashBox subscriber may receive a telephone message, a text message or an email (or all three) with a short text message to advise them that someone wants to contact them and why. Subscribers may, at their option, call back, email, text or VOX their party, at their convenience. All aspects of the communication in both directions are handled directly through the single underlying platform.

According to one embodiment of the invention, there is Genie CashBox Clients that may be created online by the subscribers and each Client may be customized with the subscriber's name or business name, their marketing slogan, their Genie Number, and other website (if any). The resulting configuration reflects what each subscriber chooses to share and display.

The following points reflect how these features are explained to Genie CashBox subscribers. This material may be intended to convey to the subscriber how the people to whom they are presenting themselves may use the Genie CashBox communication features provided to both the subscriber and their friends and/or customers. Each of the points below includes a clickable link for additional details.

According to one embodiment of the invention, Genie CashBox subscribers receive many capabilities, including but not limited to having a Virtual Check Writer, used to create valid, fully negotiable checks, payable against their funds in the subscriber's Stored Value Account. Checks created using the Virtual Check Writer may be printed and deposited as an ordinary check, negotiated in person at a participating financial institution, sent as email attachments to third parties, printed and mailed to third parties by either the subscriber or by the system, or printed and deposited electronically using any financial institutions "smart-phone" or other electronic deposit application.

According to one embodiment of the invention, there are subscriber's funds that may be maintained in a Stored Value Account. Subscribers may load funds into the Stored Value Account in any of several ways and there may be a user interface screen wherein selections and/or instructions for the same are provided:

Cash—The subscriber makes a cash deposit through a participating financial institution. Cash deposits may be made using a specially formatted deposit slip, prepared online through the Genie CashBox client.

Check—The subscriber deposits a check through a participating financial institution. As with cash deposits, check deposits may be made using a specially formatted deposit ticket, prepared online through the Genie CashBox client.

Bill Pay—The subscriber may be shown a drop-down selection of banking and financial institutions (currently the top 150 in the US). Upon selecting their financial institution from the list, they may be presented with a unique banner, created specifically for each transaction, with instructions detailing how to use their institution's bill pay service to generate and send a Bank Check directly to AllCom's lockbox for deposit into the subscriber's Stored Value Account. Bill Pay checks normally may be processed in 3-4 business days, with no charge-backs.

Mail—The subscriber sends one or more checks to AllCom by postal mail. As with cash and check deposits, mail deposits may be made using a specially formatted deposit slip, prepared online through the Genie CashBox client. The checks being tendered may be also entered online through the Genie CashBox client for verification against the mailing received.

Bank Account—The subscriber may enter the appropriate routing and account information online through the Genie CashBox client to prepare and process an online banking transaction against an account they control at an outside financial institution, such as a bank or credit union.

Credit Card—The subscriber enters information online through the Genie CashBox client, and a debit may be processed against a properly authorized credit card.

PayPal—The subscriber may enter the appropriate information online through the Genie CashBox client to authorize the transfer of funds from a PayPal account they control.

The fact that there may be no ability for anyone to "draw" funds from a Stored Value Account that they do not directly control makes the Genie Stored Value Account inherently safer than traditional DDA's, which may be subject to unauthorized withdrawals via means such as ACH.

The Micropayment Engine used for managing the stored value accounts may be described in further detail under "Monetary Handling" below.

According to one embodiment of the invention, there is a subscriber that may optionally request a Debit card, integrated with their Stored Value Account, enabling all standard Debit Card transactions. These transactions may be closed loop, occurring completely on-platform between subscribers to the service. Or they may be open loop, occurring between the subscriber and any third party that accepts debit card transactions. Debit cards may be issued by one or more major card issuers in participation with AllCom.

According to one embodiment of the invention, there is a Virtual Check Writer that may integrate with the subscriber's Stored Value Account to allow the creating of valid, fully negotiable checks, drawn against the subscriber's stored funds.

Checks created with the Virtual Check Writer may be drawn against one of several possible major financial institutions, in participation with AllCom. Management of the virtual checks between institutions may be a major component of the invention. The fund remittance features may be described in greater detail under "Financial Services" below.

According to one embodiment of the invention, the message content of material submitted through a Genie CashBox may be identical to that submitted through the Genie Messaging Gateway. The message submission process of material submitted through Genie CashBox may be identical to that of material submitted through the Genie Messaging Gateway. The message delivery process of material submitted through an Genie CashBox may be identical to that of material submitted through the Genie Messaging Gateway. Messages submitted through the Genie CashBox may have the same properties of simultaneity as those submitted through the Genie Messaging Gateway. Messages submitted through the Genie CashBox receive the same confirmation handling as those submitted through the Genie Messaging Gateway. Subscribers may respond to messages submitted through the Genie CashBox in all the same manners as those submitted through the Genie Messaging Gateway. In addition to the presentation capabilities described above, the Genie CashBox may also provide web visitors with a number of options for sending information to or otherwise communicating with the subscriber. The web visitor may initiate a voice call with the subscriber. The web visitor may be presented with two options:

Call Back—The visitor may enter a telephone number and other identifying information. The system may initiate a telephone call to the visitor at the indicated phone number, and immediately connect that phone call to the Universal Office (described below) belonging to the subscriber. The visiting caller may then able to use the features of the Universal Office to connect to the subscriber, leave a message, etc.

Web Call—If the web visitor is accessing the Genie CashBox from an audio-enabled web device (such as a computer with headset or speakers and microphone, tablet device or a smartphone), the visitor's web session may be connected directly to the subscriber's Universal Office, using Voice Over IP communication. Name, telephone number and other identifying information may be still gathered for record-keeping purposes.

The web visitor may request a connection from his or her audio-enabled web device (such as a computer with headset or speakers and microphone, tablet device or a smartphone) directly to the Conference feature of the subscriber's Universal Office. The web visitor may then participate in an audio conference with the subscriber and others, without regard to whether the other participants may be using any mixture of telephones, web devices or any other future supported technologies.

The fund remittance features may be described in greater detail under "Financial Services" below.

According to one embodiment of the invention, there is a Genie CashBox Client that may be a UNIQUE web interface, generated and hosted specifically for each subscriber, to link anyone in the online world with One-Click to subscribers and to their individual audio and/or visual information. The Genie CashBox may be an extension of the Genie Messaging interface.

The Genie CashBox product may be a unified system for receiving, managing and disbursing funds, as well as exchanging short messages from business-to-business, business-to-consumer or consumer-to-consumer, across several communications media simultaneously.

Each Genie CashBox account may include, if the subscriber chooses, an instrument called the GenieCard. The GenieCard may be a stored-value, reloadable debit card, carrying a major debit card issuer logo, and serviced through the same banking channels as all other major debit cards.

Transfer Interface—All financial transfers may be initiated using the web interface. The appropriate interface may be ONLY available through the use of the Genie CashBox (described above under Message Submission).

Transfer Target—All financial transfers made through the Genie CashBox system may be made to the GenieCard of the receiving subscriber.

Transfer Sources—The third party using the Genie CashBox system to send money to a subscriber may choose among four sources from which to submit the funds:

Credit Card—The sender may charge the desired amount to a credit card. Accepted cards include Visa, MasterCard, American Express, Discover and Diners Club. Credit Card transactions may be confirmed immediately with the source issuer, and are credited to the recipient's GenieCard after 72 hours.

GenieCard—If the sender is also a subscriber to the GenieCard system (which may be as a Genie CashBox subscriber, or as a subscriber to several other of AllCom's product packages), they may transfer the money from their own GenieCard to that of the recipient. GenieCard to GenieCard transfers are processed in real time, with the funds being immediately withdrawn from the source account and made available in the recipient account.

eCheck—The sender may elect to have the funds withdrawn electronically from a checking account. In this case, the sender may need to provide the routing and account information from their checking account.

eChecks may be processed through the Automated Clearing House (ACH) system, and require two business days to complete and be credited to the recipient account.

Cash Deposit—Finally, the sender may wish to provide cash as the method of payment. In this case, the sender will be asked to select from a list of financial institutions that are partnered with AllCom. The system may then prepare a unique deposit slip for the transaction, including all the routing information required to transfer the funds to the GenieCard account of the intended recipient. The sender then takes the deposit slip and cash funds to the selected financial institution as a regular deposit transaction. Cash deposits may be processed to the recipient GenieCard account two business days after receipt. This method may not be used with any medium other than cash. No credit card, check, money order or other instrument will be accepted.

Funds Use—Funds thus received may be available to the subscriber in the time frame as indicated above. Funds may be accessed as a cash withdrawal at any Debit-capable ATM worldwide, by making a debit purchase at the location or web site of any merchant accepting Major-logo debit cards.

Transfer Notification—The sender receives an email notification of the transfer, just as they would receive notification of a text message. The recipient receives similar notification of the transfer by email and text message.

The "Send Payment" Web Interface

The "Send Payment" screen may be used to send funds directly form the Genie CashBox subscriber to another subscriber of the Genie systems.

The "Check Writer" Web Interface

The Virtual Check Writer may be used to create check which may be printed, emailed or deposited electronically. The subscriber may use these check to withdraw funds from their Stored Value Account to use themselves, or as a payment means to any third party.

The subscriber simply enters the identifying information for the intended Payee, along with the dollar amount (which cannot be entered in an amount that would exceed the available funds on account), and an optional memo.

The system may then produce a representation of the check to be printed. The subscriber may then choose whether to:
  Email the check—a printable PDF of the check may be emailed to whatever address the subscriber enters.
  Email a Picture—a printable PDF of the check may be emailed to whatever address the subscriber enters. The PDF may include additional information suitable for electronic deposit by smart-phone or any other bank-supplied online application the depositor wishes to use.
  Mail a Check—The check may be printed by AllCom and sent by traditional postal mail to the payee at the address inscribed on the check.

According to one embodiment of the invention, upon production of the check (by email, "picture" or traditional mail), the participating financial institution on which the check is drawn may be notified electronically of the check. This electronic notification includes one or more of Name of the drawing subscriber; Name of the inscribed Payee; and/or Dollar amount of the check.

Upon presentation of the check by any of the various deposit methods, the banking institution may be able to verify the details of the check against its electronic notification, record the check as having been presented, take the appropriate payment actions (disburse cash, credit a demand account, etc.) and close the transaction.

The Check22 system may include an interactive multi-point API, combining a suite of digital solutions, which fully integrate the services and database of a subscribing merchant/lender with AllCom's Genie CashBox, while giving individual subscribers the ability to create on-demand checking instruments accessing their off-platform DDA checking accounts, Check22 enable merchants and their customers or borrowers to seamlessly convert the practice of a "grab" model of the traditional "Check 21" system to the "push" model of the Check22 system.

Through specific and selectable combinations of these features, Check22 may be tailored to suit the needs of three distinct communities of users:
  Merchants and Lenders—Businesses and individuals engaged in the selling of goods and services, including financial services.
  Agents—Sellers of communications and financial processing services to Merchants
  Consumers and borrowers This elegant solution delivers these services with a single API, from a single source, on a single platform, in a single cloud. The unique approach in this invention is that information moves from process to process on the same platform, rather than from system to system—or even from provider to provider. This approach delivers faster, more tightly integrated services with security, privacy, and safety, at a lower cost than any multi-platform competitors.

The target system for the support and integration tools of the Check22 API is AllCom's Genie CashBox, a unique e-wallet which uses a phone number (UPN) as the account number, and enables users to
  store value and maintain a balance
  send and receive peer-to-peer payments in real-time
  create GenieChecks and Check22 on demand substitute checks online which can be used to making payments to anyone online, withdraw funds by cashing or depositing them in any bank account
  email GenieChecks and Check22 on demand substitute checks to merchants, lenders and other recipients anywhere
  integrate with a Genie CashBox debit card enabling user to access their Genie CashBox funds through ATMs and anywhere the subject debit card is accepted.

The Genie CashBox is a robust e-wallet with debit card and checking features which operates as one unified solution. The invention revolves around the single-platform integration of the features listed above, and particularly the new Check22, and the special loading and use features:
  cash
  checks
  bill pay
  retail and online establishments.
  Check22 and the Genie CashBox were designed to be accessed from any:
  internet enabled device
  touch tone telephone
  Automated Teller Machine
  brick and mortar establishments
  online merchant
  cable TV.

Finally, Check22 is designed to fundamentally alter the merchant/consumer relationship as it exists today, by moving purchase and other financial transactions from a "pull"

model, wherein a consumer gives a merchant detailed information allowing the merchant to draw money from a consumer's accounts, to a "push" model, where the consumer provides no such information to the merchant, but instead actively sends their payments directly to the merchant in the form of a Check22 on demand substitute check.

The Check22 API invention specifically extends this model into tightly controlled yet flexible integration with associating a customer's existing off-platform DDA checking account with their Genie CashBox and a merchant's commerce and their payment systems.

It is understood that the included embodiments are only illustrative of the application of the principles of the present invention(s). The present invention(s) may be embodied in other specific forms without departing from its spirit or essential characteristics. The described embodiment is to be considered in all respects only as illustrative and not restrictive. The scope of the invention(s) is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A payment system over a computerized network, comprising:
    a) a requestor module that sends push-style payment requests over the computerized network, including a payer account number that is not a banking account number and not including a banking account number associated with the payer;
    b) a payer module functionally coupled to the requestor module, including a user interface module that allows a payer to authorize push-style payment requests; and
    c) an administration module functionally coupled to the payer module that effects push-style payments associated with push-style payment requests authorized by the payer module by automatically creating electronic substitute checks drawn against specific banking accounts associated with the payer.

2. The payment system of claim 1, further comprising a risk management module that performs a risk management operation before the system produces an electronic substitute check.

3. The system of claim 1, wherein the payer account number is a telephone number.

4. The system of claim 1, wherein the administration module includes a cashbox module that manages financial assets of users of the payment system.

5. The system of claim 1, wherein the administration module includes a request processing module that performs one of the following steps:
    a) registering a request;
    b) comparing a request to a standard;
    c) forwarding a request to a payer module;
    d) formatting a request to a protocol;
    e) checking request credentials;
    f) modifying a request; and
    g) delaying a request.

6. The system of claim 2, wherein the risk management module performs at least one of the tests from the group of tests, consisting of: negative file test, velocity test, national bank database test, text message confirmation, and recording confirming the purchase.

7. The system of claim 1, further comprising a cashier cash register interface module that allows a cashier to operate the requestor module.

8. The system of claim 1, wherein the administration module automatically electronically transmits created electronic substitute checks to the requestor module which automatically directly deposits the created electronic substitute checks into a bank account.

9. The system of claim 1, wherein the requestor module automatically sends a reminder message to a payer in advance of a scheduled payment.

10. The system of claim 1, wherein the requestor module schedules payment with automated reminders and authorization processes.

11. The system of claim 1, wherein the payer module is associated with two separate banking accounts and push-style payment requests are checked against available funds in the separate banking accounts.

* * * * *